(12) United States Patent
Doken

(10) Patent No.: US 12,010,157 B2
(45) Date of Patent: Jun. 11, 2024

(54) SYSTEMS AND METHODS FOR ENABLING USER-CONTROLLED EXTENDED REALITY

(71) Applicant: Rovi Guides, Inc., San Jose, CA (US)

(72) Inventor: Serhad Doken, Bryn Mawr, PA (US)

(73) Assignee: Rovi Guides, Inc., San Jose, CA (US)

( * ) Notice: Subject to any disclaimer, the term of this patent is extended or adjusted under 35 U.S.C. 154(b) by 148 days.

(21) Appl. No.: 17/706,730

(22) Filed: Mar. 29, 2022

(65) Prior Publication Data

US 2023/0319120 A1   Oct. 5, 2023

(51) Int. Cl.
*H04L 65/403* (2022.01)
*G06F 3/04847* (2022.01)
*G06T 7/20* (2017.01)
*G06V 20/40* (2022.01)

(52) U.S. Cl.
CPC ........ *H04L 65/403* (2013.01); *G06F 3/04847* (2013.01); *G06T 7/20* (2013.01); *G06V 20/41* (2022.01); *G06T 2200/24* (2013.01); *G06T 2207/10016* (2013.01)

(58) Field of Classification Search
CPC . H04L 65/403; H04L 65/1059; H04L 65/762; H04L 65/1089; G06F 3/04847; G06T 7/20; G06T 2200/24; G06T 2207/10016; G06T 11/00; G06V 20/41
See application file for complete search history.

(56) References Cited

U.S. PATENT DOCUMENTS

| | | | |
|---|---|---|---|
| 8,875,031 B2 | 10/2014 | Periyannan et al. | |
| 9,143,729 B2 | 9/2015 | Anand et al. | |
| 9,374,233 B2 | 6/2016 | Narayanan | |
| 10,200,654 B2 | 2/2019 | Szymczyk et al. | |
| 10,264,215 B1 | 4/2019 | Sadanand | |
| 10,498,973 B1 | 12/2019 | Zavesky et al. | |
| 10,917,445 B2 | 2/2021 | Andon et al. | |
| 2003/0067536 A1 | 4/2003 | Boulanger et al. | |
| 2009/0207233 A1 | 8/2009 | Mauchly et al. | |
| 2012/0327172 A1 | 12/2012 | El-Saban et al. | |

(Continued)

OTHER PUBLICATIONS

Zhao et al., "Creating better virtual backdrops for video calling, remote presence, and AR," ML Applications, Computer Vision dated Feb. 8, 2022 (12 pages) https://ai.facebook.com/blog/creating-better-virtual-backdrops-for-video-calling-remote-presence-and-ar/.

(Continued)

*Primary Examiner* — Michael E Teitelbaum
(74) *Attorney, Agent, or Firm* — HALEY GUILIANO LLP

(57) ABSTRACT

Systems and methods are described for enabling user-controlled extended reality (XR). The provided systems and methods may determine an XR portion should be included in a video feed that comprises a depiction of a first user, and the XR portion may be configured to occlude the entity in the video feed. An entity may be detected in the video feed, and user input may be received specifying that a detected entity in the video feed should not be occluded by the XR portion. Based on the user input, the video feed may be modified to exclude the XR portion from a portion of the video feed depicting the detected entity, wherein the portion is included at a different portion of the video feed, and the depiction of the first user is included in the video feed, and transmit the modified video feed to a second user device.

20 Claims, 15 Drawing Sheets

(56) References Cited

U.S. PATENT DOCUMENTS

| | | |
|---|---|---|
| 2013/0016097 A1 | 1/2013 | Coene et al. |
| 2015/0091891 A1 | 4/2015 | Raheman et al. |
| 2020/0045261 A1 | 2/2020 | Lim et al. |
| 2020/0169586 A1 | 5/2020 | Wang et al. |
| 2020/0221119 A1 | 7/2020 | Lee |
| 2021/0019892 A1 | 1/2021 | Zhou et al. |
| 2021/0118231 A1 | 4/2021 | Hutten et al. |
| 2021/0352245 A1 | 11/2021 | Zavesky et al. |
| 2022/0385857 A1* | 12/2022 | Ittelson .................. H04N 7/147 |
| 2023/0308610 A1* | 9/2023 | Henderson .............. G06F 3/011 |
| | | 345/633 |
| 2023/0319221 A1 | 10/2023 | Doken |

OTHER PUBLICATIONS

U.S. Appl. No. 17/706,737, filed Mar. 29, 2022, Serhad Doken.

Nasir, et al., "Depth based object prioritisation for 3D video communication over Wireless LAN," 16th IEEE International Conference on Image Processing (ICIP), pp. 4269-4272 (2009).

Sato, et al., "Person Region Extraction and Background Replacement in Images for Privacy Protection," International Journal of the Society of Materials Engineering for Resources, 23(2):162-166 (2018).

* cited by examiner

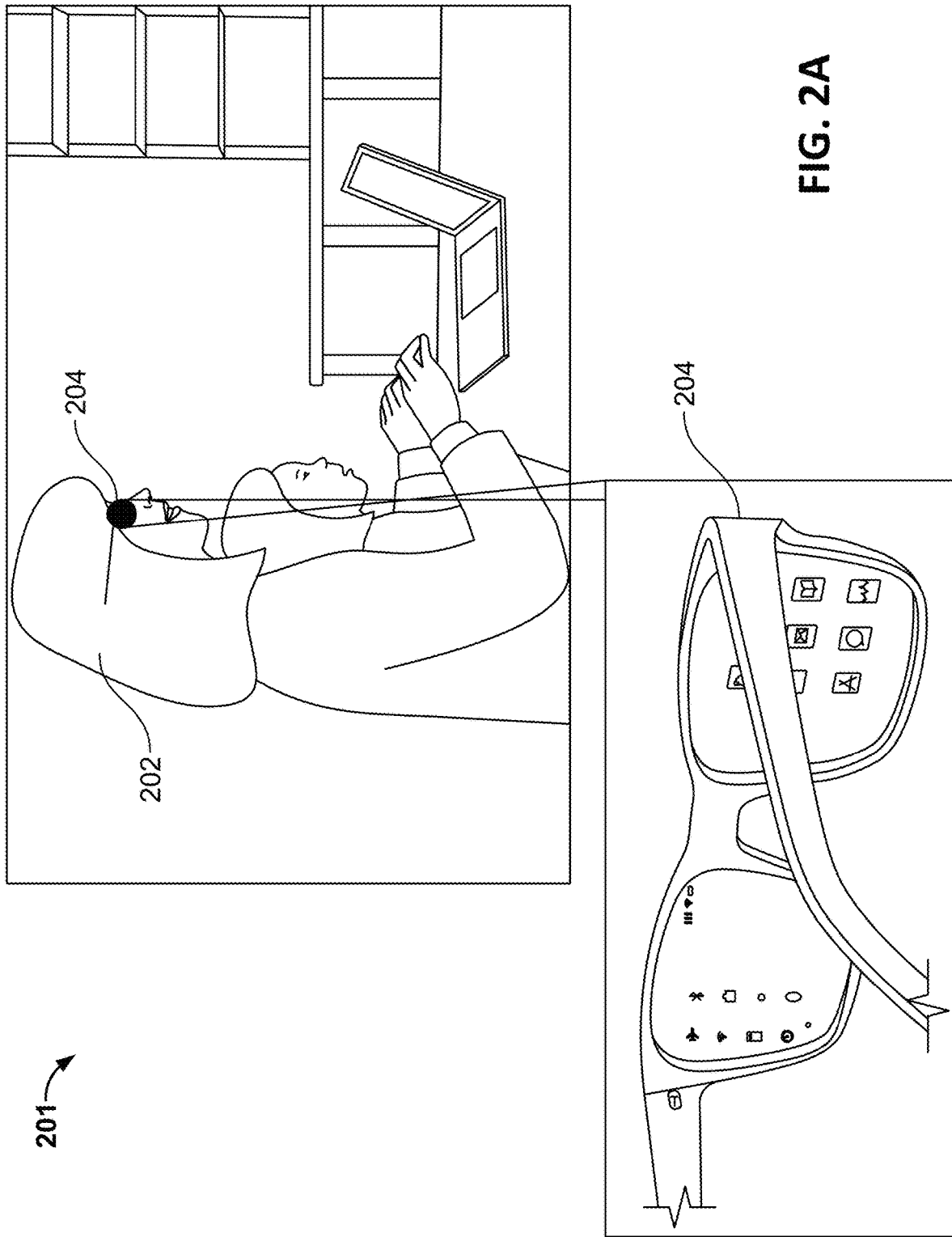

SYSTEMS AND METHODS FOR ENABLING USER-CONTROLLED EXTENDED REALITY

BACKGROUND

This disclosure is directed to systems and methods for enabling user-controlled extended reality (XR). In particular, techniques are disclosed for modifying a video feed comprising an XR portion such that the modified video feed does not occlude an entity (other than a main user) detected in the video feed. In addition, techniques are disclosed for modifying portions of frames of the video feed using first and second masks for a first user and a second user.

SUMMARY

Advancements in communication technology have improved the ability of users to communicate with colleagues, family and friends located in different physical locations than the user. For example, conferencing systems (e.g., Microsoft® Teams, Skype®, Zoom™, etc.) may be used to host online video meetings, with parties joining virtually from around the world. Such video meetings enable colleagues in separate, geographically distributed physical locations to have a collaborative face-to-face conversation via a video conference, even if one or more of such users are on the go (e.g., utilizing a smartphone or a tablet). As another example, some social network platforms (e.g., Snapchat®, TikTok®, Instagram®, Facebook®, etc.) allow a user to share a recorded video with other users or live stream a video, and other services (e.g., Apple FaceTime, Google Hangouts, etc.) allow unscheduled video calls between users.

Recently, the COVID-19 pandemic led to employees working remotely on an unprecedented, massive scale. When millions of companies went fully remote during this time, video conferencing became the logical solution for connecting the remote workforce and keeping teams productive from home. In a matter of weeks, video conferencing usage exploded, permeating nearly all aspects of professional and personal life. In addition to business-related meetings, people around the globe are using video conferencing to host virtual happy hours, ice breaker activities, online games, wine tastings, birthday parties and other social activities. Many users have been accustomed to using virtual backgrounds during such video communication sessions, such as to display their favorite place or object, add a personal touch, or simply hide their physical background, which they may not wish to share with the other conference participants. Virtual backgrounds might be considered the first instantiation of pervasive application of Augmented Reality (AR) within the 2D domain. For more traditional meetings, virtual backgrounds are useful tools to present a more professional look or added privacy, particularly if a user joins a conference call from a public space, or is working from home, and wants call participants to focus on himself or herself, rather than his or her background.

In one approach for implementing virtual backgrounds, a virtual background is generated so as to be static, i.e., set before sessions to replace the entire background with an image or video such that the video shows only the user and the virtual background. This is based on the assumption that there is a single person engaged in that conference through a specific device (likely a desktop). However, such approach does not provide the user with the ability to control what should or should not be visible within the physical background and overlaid with a virtual background. That is, such approach constitutes an all or nothing experience, and the user's virtual background struggles to adapt to changing dynamic environmental conditions. For example, in such approach, there may be two, three or more people in a video conferencing session, are all looking at a particular device screen. Once a virtual background is applied, the receiving parties may not be able to see any of such other people (behind the main participant) whose presence is covered by the virtual background, and/or portions of such people behind the main participant may be obscured. This may implicate compliance, privacy and/or security concerns since, unbeknownst to participants at other locations, there may be multiple people participating in the video conference, and if this was known to the other participants, such participants may have the perception of being spied on without their consent. This may be distinct from a phone call or audio-only call where user expectations may differ, i.e., a user may take into account that other users may be on speaker phone.

Another problem with this approach is that while the virtual background is being applied, it is difficult to show other users participating in the video communication session or other objects, even objects in the foreground, which negatively impacts user experience. Such objects are rendered blurry with certain portions obscured, if they appear at all, because these objects are being overwritten by the virtual background algorithm (i.e., a "chroma-key" or "green screen" background removal method) if they fall outside of the main participant border image. Yet another problem is, while the virtual background is applied, the user may have no control of which objects from his or her non-virtual background to blend with the virtual one, even if that is desired by the user.

To overcome these problems, systems and methods are provided herein for enabling user control of extended reality (XR) portions of a video feed or other image of a video or other media communication session. Such systems and methods may comprise a first user device associated with a first user, wherein a server is configured to establish a video communication session over a network. Such video communication session may enable the first user device to present a depiction of a second user, associated with a second user device, and an environment surrounding the second user. Such video communication session may also enable the second user device to present a depiction of the first user and an environment surrounding the first user, and wherein a portion of the environment surrounding the first user comprises an entity other than the first user. Control circuitry (e.g., of the first user device) may be configured to perform a process comprising determining that an XR portion should be included in a video feed of the video communication session, wherein the video feed comprises the depiction of the first user, and the XR portion is configured to occlude the entity in the video feed. The control circuitry may detect the entity in the video feed and receive user input specifying that the entity should not be occluded by the XR portion in the video feed. The control circuitry may modify, based on the user input, the video feed to exclude the XR portion from a portion of the video feed depicting the detected entity. Such XR portion may be included at a different portion of the video feed, and the depiction of the first user may be included in the video feed. The control circuitry may transmit the modified video feed to the second user device via the server.

Such systems and methods may further provide for control circuitry to perform a process comprising accessing one or more frames of a video feed captured by a camera of the first user device, wherein the one or more frames depict the environment surrounding the first user. The control circuitry may classify each portion of the one or more frames as belonging to a physical background of the environment surrounding the first user, as belonging to the depiction of the first user, or as belonging to a depiction of an additional entity. An XR portion may be configured to be inserted in at least one portion of the one or more frames corresponding to the physical background of the environment of the user. The control circuitry may generate a first mask for the depiction of the first user, wherein the first mask defines the boundaries of the depiction of the first user in the one or more frames and the XR portion is not inserted within the boundaries defined by the first mask. The control circuitry may generate a second mask for the depiction of the additional entity, wherein the second mask defines the boundaries of the depiction of the additional entity in the one or more frames and the XR portion is not inserted within the boundaries defined by the second mask. The control circuitry may modify the one or more frames by combining the portions of the one or more frames belonging to the physical background with the first mask and the second mask. The control circuitry may further encode the video feed comprising the one or more modified frames, and transmit the encoded video feed to the second user device via the server.

Such aspects may provide a user control with respect to which entities (e.g., objects and/or users and/or animals) should or should not be occluded by an XR portion in a video feed of a video communication session or other video to be generated, stored and/or transmitted. For example, the system may enable a user to specify particular entities in the video feed, or types of entities in the video feed, or particular portions of the video feed or depths of the video feed, at which the XR portion should not be inserted. In addition, such aspects may improve the user experience by enabling the system to dynamically adapt to changing environmental conditions. For example, if another person or an animal user is detected as entering the physical environment in the background of an ongoing video feed, the XR portion may be caused not to occlude such detected entity, based on user input and/or user preferences, and/or the main video participant in the environment may be notified of the detection. In some embodiments, segmentation masks may be generated and utilized for each detected entity, and may be combined with a background portion (e.g., comprising the XR portion) of a frame representing the physical environment of the user to modify one or more frames. Such one or more frames may be encoded for transmission to other video communication session participants and/or for storage at any suitable device and/or transmission to any suitable device.

In some aspects of this disclosure, the video communication session corresponds to a video conference in which the first user and the second user are participants, and the XR portion is a virtual background simultaneously presented with the depiction of the first user. The virtual background may be configured not to occlude the entity specified by the user input. In some embodiments, the video communication session corresponds to an augmented reality scene simultaneously presented with the depiction of the first user.

In some embodiments, the entity corresponds to one or more other users in the environment surrounding the first user or one or more objects in the environment surrounding the first user.

In some aspects of this disclosure, the server is further configured to receive an API request from a service provider, and transmit, via the API, one or more software tools to enable the service provider to perform one or more of the determining, the detecting, the receiving, the modifying and the transmitting.

In some embodiments, the control circuitry of the first user device is configured to generate for display a user interface element, at which the user input specifying that the entity should not be occluded by the XR portion in the video feed is received. Such user interface element may include a plurality of options comprising a first option to cause the video feed to comprise the XR portion surrounding the depiction of the first user and occluding any entities in the background surrounding the first user. Such user interface element may include a second option to cause the video feed to comprise the XR portion, the first user, and one or more additional users detected in the environment surrounding the first user. Such user interface element may include a third option to cause the video feed to comprise the XR portion, the first user, and one or more objects detected in the environment surrounding the first user. Such user interface element may include a fourth option to cause the video feed to comprise no XR portion surrounding the depiction of the first user.

In some aspects of this disclosure, the control circuitry is configured to receive the user input specifying that the entity should not be occluded by the XR portion in the video feed during the video communication session. The control circuitry may perform the modifying by dynamically modifying the video feed to exclude the XR portion from the portion of the video feed depicting the detected entity.

In some embodiments, the control circuitry is further configured to receive, via the server and from the second user device, a video feed comprising an XR portion modifying an appearance of the environment surrounding the second user. The control circuitry may be configured to modify, based on user input received from the first user, the appearance of the environment surrounding the second user, for presentation at the first user device.

In some aspects of this disclosure, the control circuitry is further configured to determine ambient conditions of the environment surrounding the first user, and determine whether one or more entities should be not be occluded from the XR portion based on the determined ambient conditions.

In some embodiments, the first user device corresponds to a near-eye display device, and the control circuitry is further configured to receive, via the server and from the second user device, a video feed comprising a depiction of the second user. The control circuitry may cause an XR portion to span a full field of view of the near-eye display device, while generating for display the video feed depiction of the second user.

In some aspects of this disclosure, the control circuitry is further configured to detect that an entity is moving within the environment surrounding the first user, and cause the detected entity not to be occluded by the XR portion otherwise spanning the full field of view of the near-eye display device.

In some embodiments, the control circuitry is configured to modify the frame using the first mask and the second mask by generating a foreground mask based on the first mask and the second mask. The control circuitry may further be configured to generate a background mask based on the portions of the frame classified as belonging to a physical background of the environment surrounding the first user. Prior to performing the encoding, the control circuitry may be configured to mix the background mask and the foreground mask. In some aspects of this disclosure, the foreground mask comprises first depth information associated with the first mask and second depth information associated with the second mask, wherein the first depth information and the second depth information are different.

In some aspects of this disclosure, the encoded video feed comprises depth information associated with the depiction of the user and depth information associated with depiction of the additional entity.

In some embodiments, the control circuitry is further configured to receive user input indicating a particular depth at which the XR portion should not be inserted in the video feed, and generate the second mask based on the user input.

In some aspects of this disclosure, the control circuitry is further configured to receive user input of a selectable option to indicate that one or more entities should not be occluded by the XR portion in the video feed, and generate the second mask based on the user input.

In some embodiments, the control circuitry is further configured to determine a capability of the first user device, and, based on the determined capability, prevent user selection of a selectable option to indicate that one or more entities should not be occluded by the XR portion in the video feed.

In some aspects of this disclosure, the control circuitry is further configured to determine a capability of the first user device, and, based on the determined capability, offload at least a portion of the encoding or the generating of the first mask or the second mask to a device that is remote from the first user device.

In some embodiments, the second user device comprises control circuitry configured to receive the encoded video feed over the network via the server, decode the encoded video feed, and generate for display the decoded video feed comprising the XR portion, the portion corresponding to the first user, and the portion corresponding to the additional entity.

In some aspects of this disclosure, the entity corresponds to an additional user in the environment surrounding the first user or an object in the environment surrounding the first user.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 2A-2B show an illustrative scenario in which a system for enabling user-controlled extended reality may be implemented, in accordance with some embodiments of this disclosure.

DETAILED DESCRIPTION

Figure 1A:
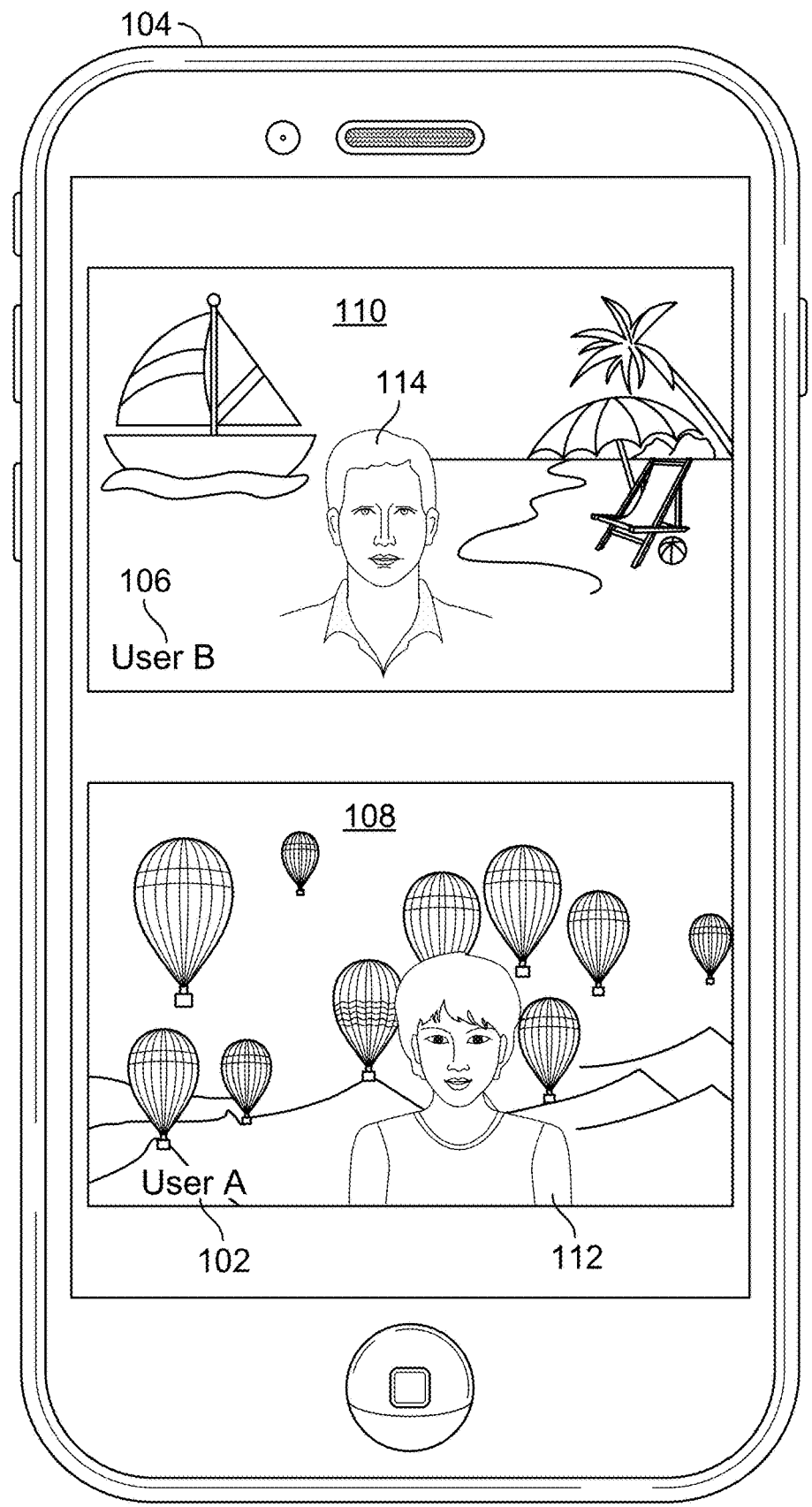
FIGS. 1A-1H show illustrative user device displays of a system for enabling user-controlled extended reality, in accordance with some embodiments of this disclosure.

FIGS. 1A-1H shows illustrative shows illustrative user device displays of a system for enabling user-controlled extended reality, in accordance with some embodiments of this disclosure. User device 104 associated with user 102 may be, e.g., a mobile device such as a smartphone or tablet, a laptop, a desktop computer, a smart watch or wearable device, smart glasses, a stereoscopic display, a wearable camera, AR glasses, an AR head-mounted display (HMD), a virtual reality (VR) HMD or any other suitable computing device, or any combination thereof. A video communication application may be configured to establish a video communication session over a network (e.g., network 409 of FIG. 4) with one or more other users (e.g., user 106). The video communication application may be configured to be executed at least in part on user device 104 and/or at one or more other user devices participating in the video communication session, and/or at one or more remote servers such as, for example, a server 404 of FIG. 4).

The video communication application may enable user device 104 associated with user 102 to receive over the network audio signals and images. For example, such audio signals may be spoken by user 106 and/or other audio present in the environment surrounding user 106, and detected by a microphone of a user device of user 106, or audio detected by a microphone of any other user participating in the video communication session. The images may be still images and/or video, captured by a camera of a user device of user 106 depicting user 106 and/or the environment surrounding user 106. Additionally or alternatively, the video communication application may enable user device 104 associated with user 102 to receive over the network textual messages and/or a shared screen and/or any other suitable content may be received over the network in connection with the video communication session. The video communication application may further enable a user device associated with user 106 to receive over the network audio signals and images. For example, such audio signals may be spoken by user 102 and/or other audio present in the environment surrounding user 102, and detected by a microphone of a user device of user 102, or audio detected by a microphone of any other user participating in the video communication session. The images may be still images and/or video, captured by a camera of a user device of user 102 and captured by a camera of a user device 104 depicting user 102 and/or the environment surrounding user 102. Additionally or alternatively, the video communication application may enable the user device associated with user 106 to receive over the network textual messages and/or a shared screen and/or any other suitable content may be received over the network in connection with the video communication session. In some embodiments, the video communication application may facilitate a communication session that does not necessarily include video elements, e.g., a communication session during which static images or GIFs or any other suitable imagery may be transmitted between user devices.

In some embodiments, the video communication session may be hosted by one or more remote servers (e.g., server

Figure 4:
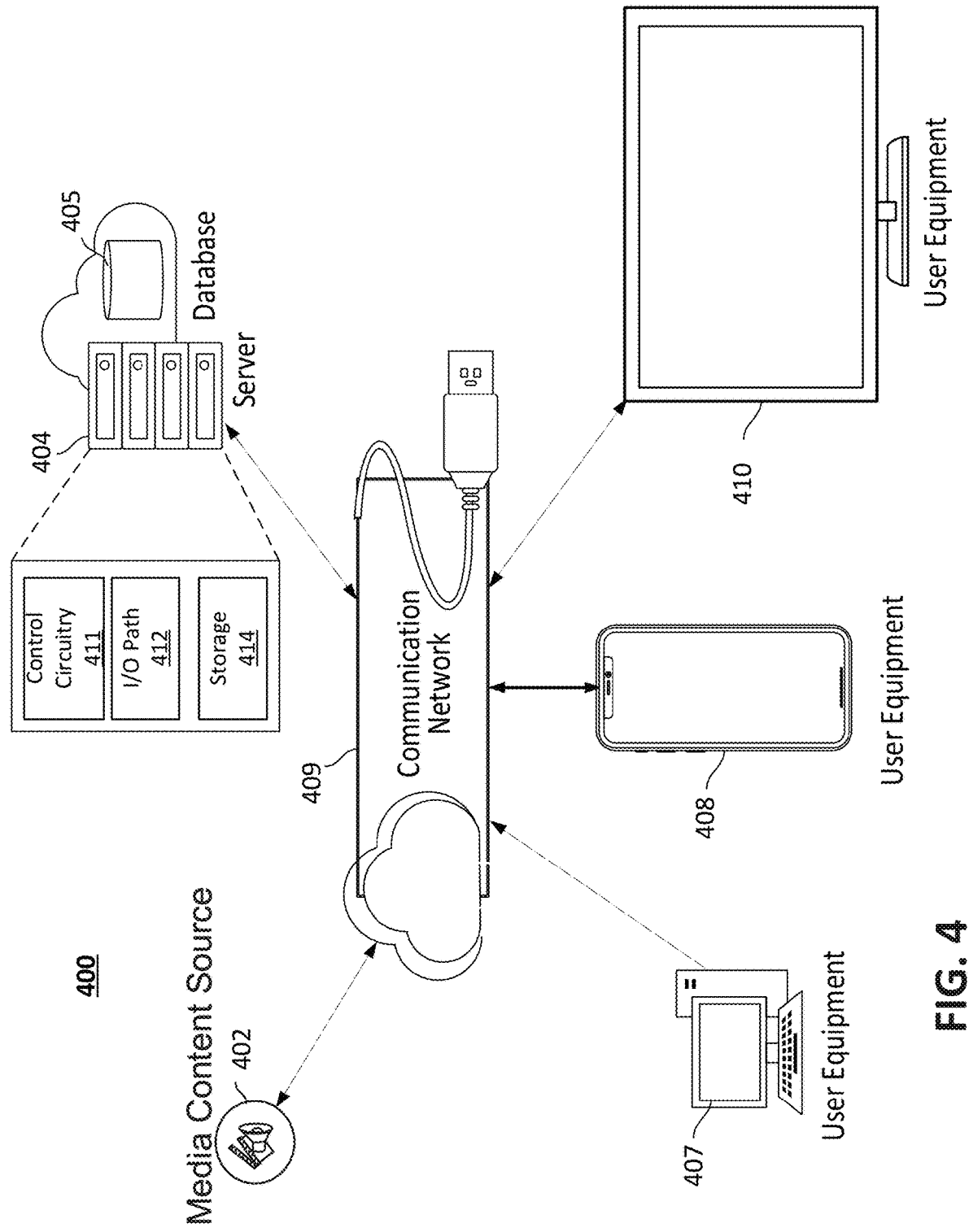
FIG. 4 shows a system, in accordance with some embodiments of this disclosure.

404 of FIG. 4). In some embodiments, the video communication session can be a video conference or a video chat, e.g., scheduled for a particular time or spontaneously created at the request of a user, with any suitable number of participant. In some embodiments, each user may access the video communication session via a connected device (which may be equipped with or otherwise proximate to a camera and a microphone) accessing one or more of a web address or virtual room number, e.g., by entering his or her username and password. In some embodiments, one or more users may be a moderator or host, where a designated moderator may have the task of organizing the meeting and/or selecting the next participant member to speak or present. In some embodiments, the video communication application may be utilized in recording a video, which may be transmitted in real time (e.g., live-streamed) to other users. In some embodiments, the video may be recorded, stored and transmitted at a later time to other users and/or posted to any suitable website or application (e.g., a social network, video sharing website application, etc.) for consumption by other users.

In some embodiments, video and audio feeds associated with the respective video communication session participants may be transmitted separately during the video communication session, along with a header or metadata (e.g., time stamps). Such header or metadata may enable synchronization of the audio and video feed at the destination device, or audio and video data may be combined as a multimedia data stream. In some embodiments, any suitable audio or video compression and/or encoding techniques may be utilized. Such techniques may be employed prior to transmitting the audio and/or video components of the video communication session from a user device to a server. In some embodiments, at least a portion of such video compression and/or encoding may be performed as one or more remote servers (e.g., an edge server and/or any other suitable server). In some embodiments, the receiving or rendering user device may perform decoding of the video and/or audio feeds or multimedia data stream upon receipt, and/or at least a portion of the decoding may be performed remote from the receiving user device. In some embodiments, user 102 and user 106 may be located in different geographical locations, and the video communication session may be assigned, e.g., by server 404 of FIG. 4, a unique video communication session identifier. While two users are shown participating in the video communication session in the example of FIG. 1, any suitable number of users may participate in the video communication session. Depictions of the users participating in the video communication session may be arranged in any suitable format (e.g., to depict a current speaker only, to depict each conference participant including the user himself or herself, a subset of the conference participants, etc.).

The video communication application may be configured to generate for display an indication of a user name ("User A") associated with a user profile or user account of user 102 associated with the video communication application (or an account or profile of the user with another service, e.g., a social network), and a depiction 112 of user 102. An indication of a user name ("User B") associated with a user profile or user account of user 106 may be generated for display with a depiction 114 of user 106. In some embodiments, the video communication application may generate for display an indication of a total duration of the video communication session and/or an elapsed time of the video communication session. In some embodiments, the video communication application may generate for display a selectable option to mute the user's own microphone and/or a selectable option turn off the user's own camera, a chat function, and any other suitable number or type of selectable options or information.

The video communication application may be configured to insert an extended reality (XR) portion or XR element at any suitable portion of a video feed (and/or at any suitable portion of a static image), which may be displayed at user device 104 and transmitted to one or more devices of other users participating in the video communication session. XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real world objects. MR systems may map interactive virtual objects to the real world, e.g., where virtual objects interact with the real world or the real world is otherwise connected to virtual objects.

In some embodiments, the environment depicted behind a user (e.g., as seen by that user and/or any suitable number of other users during the video communication session) may generally (e.g., as a default setting such when the video communication application is initially launched) correspond to the actual physical environment (116 of FIG. 1B) of the user. Such actual physical environment may correspond to the environment that the user is situated in (e.g., an office building, a home office, a basement, a public setting when user device 104 is a mobile device, etc.). In the example of FIG. 1A, the video communication application may generate for display XR portion 108 (e.g., a virtual background comprising balloons and a mountainous landscape), which replaces the physical environment 116 of user 102 and surrounds the depiction 112 of user 106. The video communication session may generate for display XR portion 110 (e.g., a virtual background comprising a beach and sailboat), which replaces the physical environment of user 106 and surrounds the depiction 114 of user 106. The virtual background surrounding a depiction of a particular user may depict any suitable image or video or animation simulating an environment desired by the particular user. In some embodiments, the virtual background may comprise augmented reality elements to alter the appearance of user 102 to other video communication session participants, blurring of the physical environment, or blacking out of the physical environment. In some embodiments, virtual background 108 may be selected by user 102 from among a plurality of virtual backgrounds provided by the video communication application, or the video communication application may permit user 102 to upload an image for use as a virtual background, or import virtual backgrounds from any suitable source. In some embodiments, the virtual background may, at least when initially selected, occlude the entire background 116 or field of view of user device 104, aside from depiction 112 of user 102.

The video communication application may employ any suitable technique to perform insertion of an XR portion, which may be performed at the respective user devices participating in the video communication session and/or at one or more remote servers. For example, the video communication application may employ image segmentation (e.g., semantic segmentation and/or instance segmentation)

and classification to identify and localize different types or classes of entities in frames of a video feed. Such segmentation techniques may include determining which pixels belong to a depiction of main user 102, and/or which pixels should be mapped to a particular facial feature (e.g., head, nose, ear, eyes, shoulder, mouth, etc.) or any other suitable feature of user 102. Such segmentation technique may include determining which pixels belong to the physical environment 116 surrounding the user. Such segmentation technique may include determining which pixels belong to other entities within physical environment 116, such as, for example, other users, animals or other objects in the video feed. In some embodiments, segmentation of a foreground and a background of the video feed may be performed. The video communication application may identify a shape of, and/or boundaries (e.g., edges, shapes, outline, border) at which, depiction 112 of user 102 ends and/or analyze pixel intensity or pixel color values contained in frames of the video feed. The video communication application may label pixels as belonging to depiction 114 or the actual physical background, to determine the location and coordinates at which XR portion 108 may be inserted into the video feed, using any suitable technique. For example, the video communication application may employ machine learning, computer vision, object recognition, pattern recognition, facial recognition, image processing, image segmentation, edge detection, or any other suitable technique or any combination thereof. Additionally or alternatively, the video communication application may employ color pattern recognition, partial linear filtering, regression algorithms, and/or neural network pattern recognition, or any other suitable technique or any combination thereof.

The video communication application may generate, based on the image segmentation, a mask for each entity in one or more frames of a video feed of the video communication session. Each mask may define the boundaries of a particular entity depicted in the feed, to distinguish portions of the video feed corresponding to an entity from portions of the video feed corresponding to a physical background (at which an XR portion may be inserted in the video feed) of the user in a particular environment. For example, in order to generate such one or more masks, each pixel may be labeled as belonging to a particular type or class or sub-class of an entity (e.g., a person, an adult, a child, an animal, a particular type of object, a particular user, etc.). Additionally or alternatively, any other suitable annotation or mechanism may be utilized (e.g., a bounding box or other bounding shape) to define a location of one or more entities in each frame (or across multiple frames) of the video feed. In some embodiments, with respect to depiction 112 of user 102, the mask may be a binary mask in which pixels belonging to depiction 112 of user 102 may be set to a first pixel value (e.g., a white color, corresponding to an intensity value of one, and which may correspond to a foreground). In such binary mask, the physical background may be set to a second pixel value (e.g., a black color, corresponding to an intensity value of zero, and which may correspond to a background). In some embodiments, each entity (or entity type or class) instance may be assigned a respective unique mask. A unique pixel value and/or color for a person (e.g., persons 118, 120 of FIG. 1B) may be assigned as compared to pixel values assigned to animals and as compared to those assigned for objects (e.g., clock 122, door 124, poster 126 of FIG. 1B), and/or each entity may be associated with a unique mask. In some embodiments, the mask may comprise a vector comprising any suitable number of dimensions. For example, a vector representation of the mask may specify pixel value information and/or encode information regarding a depth of the object, e.g., a distance from a camera of user device 104, relative to other identified objects in the scene. For example, user 102 may be regarded as the main video communication session participant in a particular environment based on being determined to be associated with coordinates located closest to the camera of device 104 (e.g., as compared to persons 118 and 120 of FIG. 1B).

In some embodiments, the mask may be utilized by the video communication application to modify one or more frames of the video feed, e.g., by combining or mixing one or more masks corresponding to respective entities with the physical background. In some embodiments, multiple masks corresponding to different entities (e.g., user 102 and user 118) may be generated as a foreground mask, and a background mask may be generated for the physical background of environment 116. In some embodiments, such foreground and background masks may be mixed prior to performing encoding of the one or more frames of the video feed. In some embodiments, the foreground mask may specify different depth information for depiction 112 of user 102 and the depiction of user 118, e.g., indicating that user 118 is at a distance that is farther from a camera of user device 104 than user 102.

In some embodiments, the video communication application may be configured to perform compression and/or encoding and/or bit reduction techniques on digital bits of the data of the video communication session. Such techniques may reduce the amount of storage space required to store the image data and/or to reduce the bandwidth or network resources required to transmit the image data over a network or other suitable wireless or wired communication medium and/or enable bit rate savings with respect to downloading or uploading the image data. Such techniques may encode the image data such that the encoded image data may be represented with fewer digital bits than the original representation while minimizing the impact of the encoding or compression on the quality of the video or one or more images. In some embodiments, such compression or encoding techniques may compress the data by exploiting spatial and/or temporal predictions for interframe or intra-frame similarities. For example, such techniques may exploit the fact that adjacent or nearby portions of a frame, and/or consecutive frames, may have a significant amount of redundancy with respect to each other. The video communication application may employ High Efficiency Video Coding (HEVC) H.265, the Versatile Video Coding (VVC) H.266 standard, the H.264 standard, the H.263 standard, MPEG-4, MPEG-2, or any other suitable codec or standard, or any combination thereof. In some embodiments, in performing the encoding, the video communication application may take into account an appropriate format of the image data for a particular target device (e.g., a particular type of device and/or a particular platform or operating system) that is to receive the data. In some embodiments, different versions of the image data may be stored or transcoded on the fly for different types of client devices.

In some embodiments, the segmentation mask may be utilized to identify portions of the video feed at which the XR portion should be superimposed, and/or which entities should be blended with the XR portion or should be occluded or overwritten by the XR portion. For example, the video communication application may determine to superimpose the XR portion at all portions of the user's background other than the portions of the background specified by a mask associated with user 102 (or at a subset thereof). As another example, the video communication application may determine to superimpose the XR portion at other than portions of the background specified by other masks (e.g., generated for particular entities). In some embodiments, the video communication application may be configured to track motion of entities from frame to frame, to accurately localize the entity in each frame, and maintain continuity of one or more masks and the one or more XR portions. For example, the video communication application may take into account motion of user 102 in the video feed during the XR processing. In some embodiments, this may be performed by comparing image frames of video to reveal motion over a period of time, e.g., if the video is captured in 30 frames per second, each of the 30 frames may be analyzed to determine if there is motion in each or any of the frames. In some embodiments, motion vectors may be generated that describe an amount of motion with respect to consecutive frames of the video communication session.

The video communication application running at user device 104 may be configured to transmit the video feed resulting from generating the XR portion (e.g., the video feed comprising XR portion 108 and depiction 112 of user 102) to the one or more remote servers (e.g., server 405 of FIG. 4). Such one or more servers may process and/or route the video feed received from user device 104 to a user device associated with user 106 participating in the video communication session and/or any other users participating in the communication session. Similarly, the video communication application (e.g., running a user device 104) may be configured to transmit the video feed resulting from generating the XR portion (e.g., the video feed comprising XR portion 110 and depiction 114 of user 106 of FIG. 1C) to the one or more remote servers (e.g., server 405 of FIG. 4). Such one or more servers may process and/or route the video feed received from user device 106 to user device 104 associated with user 102 participating in the video communication session.

Figure 1B:
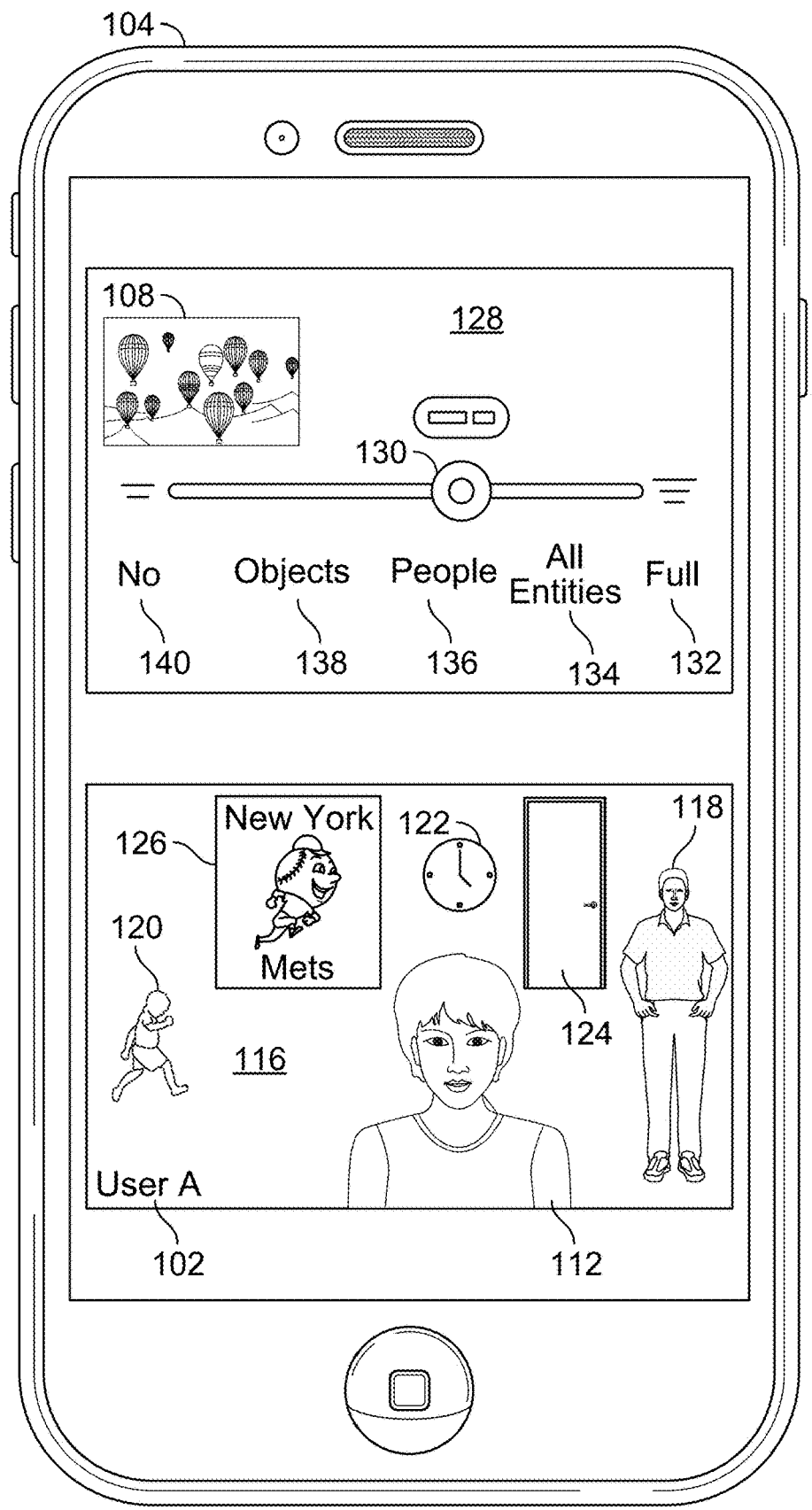

FIG. 1B shows a depiction 112 of user 102 and a physical environment 116 surrounding user 102, as captured by a camera included as part of, or otherwise proximate to, user device 104. Environment 116 may comprise any suitable number of entities, e.g., other persons, animals or objects, such as, for example, adult 118, child 120, clock 122, door 124, and poster 126. In some circumstances, one or more of the entities, e.g., person 118 and/or user 120 or a dog (not shown) that is a pet of user 102, may be present in the video feed from a beginning of the video communication session, or may enter environment 116 during the video communication session. The video communication application may be configured to detect the presence of, classify and/or localize such one or more entities at the beginning of the video communication session. The video communication application may dynamically detect the presence of, classify and/or localize such one or more entities during the video communication session (e.g., in response to detecting user input, and/or in response to detecting motion or another triggering event). The video communication application may utilize the aforementioned image segmentation techniques and generate respective masks for certain entities or types of entities, and may monitor physical environment 116 of user 102 for motion of entities while XR portion 108 is being display. Upon detecting entry of an entity (e.g., person 118 of FIG. 1F) into a field of view of user device 104 and/or entry into environment 116, notification 142 may be provided, which may be selectable to blend person 118 into XR portion and enable other users to see person 118 in the video feed. Alternatively, person 118 may be automatically blended into XR portion 108 upon detecting the presence of such entity in a current frame, and may continue to be blended into XR portion 108 while in the field of view. In some embodiments, the video communication application may require that the motion be above a particular threshold over a particular period of time prior to notifying the user or taking other action, e.g., to avoid modifying the display based on minor movements, such as a clock hand moving.

In some embodiments, the video communication application may utilize any suitable number or types of image processing techniques to identify objects depicted in frames and images captured by one or more cameras associated with user device 104 and cameras associated with a user device of other video communication session participants. In some embodiments, the video communication application may utilize one or more machine learning models (e.g., naive Bayes algorithm, logistic regression, recurrent neural network, convolutional neural network (CNN), bi-directional long short-term memory recurrent neural network model (LSTM-RNN), or any other suitable model, or any combination thereof) to localize and/or classify objects in the environment. For example, the machine learning model may output a value, a vector, a range of values, any suitable numeric representation of classifications of objects, or any combination thereof indicative of one or more predicted classifications and/or locations and/or associated confidence values. In some embodiments, the classifications may be understood as any suitable categories into which objects may be classified or characterized. In some embodiments, the model may be trained on a plurality of labeled image pairs, where image data may be preprocessed and represented as feature vectors. For example, the training data may be labeled or annotated with indications of locations of multiple entities and/or indications of the type or class of each entity.

As another example, the video communication application may extract one or more features for a particular object and compare the extracted features to those stored locally and/or at a database or server storing features of objects and corresponding classifications of objects. For example, if dimensions, shape, color, or any other suitable information, or any combination thereof, is extracted from one or more images of object 122, the video communication application may determine object 122 corresponds to a clock based on a similarity between the extracted information and stored information. In some embodiments, a Cartesian coordinate plane is used to identify a position of an object in environment 116, with the position recorded as (X, Y) coordinates on the plane. In some embodiments, the coordinates may include a coordinate in the Z-axis, to identify a depth of each identified object in 3D space, based on images captured using 3D sensors and any other suitable depth-sensing technology. In some embodiments, coordinates may be normalized to allow for comparison to coordinates stored at the database in association with corresponding objects. As an example, the video communication application may specify that an origin of the coordinate system is considered to be a corner of a field of view within or corresponding to environment 116. The position of the object may correspond to the coordinates of the center of the object or one or more other portions of the object.

Additionally or alternatively, the video communication application may utilize or be in communication with any suitable number and types of sensors to determine information related to the entities in environment 116. For example, such one or more sensors may be an image sensor, ultrasonic sensor, radar sensor, LED sensor, LIDAR sensor, or any other suitable sensor, or any combination thereof, to detect and classify objects in environment 116. One or more sensors of user device 104 may be used to ascertain a location of an object by outputting a light or radio wave signal, and measuring a time for a return signal to be detected and/or measuring an intensity of the returned signal. In some embodiments, the video communication application may be configured to receive input from user 102 identifying a location and/or classification of a particular entity.

In some embodiments, one or more devices and/or one or more objects in environment 116 may be configured to communicate wirelessly, as part of detecting objects in environment 116. For example, a device associated with user 118, a device associated with user 120, and/or an Internet of Things (IoT) device (e.g., clock 122 or any other suitable object) may be equipped with sensors (e.g., a camera or image sensor, a microphone, or any other suitable sensors or any combination thereof) or other circuitry (e.g., wireless communication circuitry). Such sensors may be used indicate to the video communication application a location of an entity within environment 116 and/or an indication that an entity is of a particular type (e.g., a lamp or any other suitable household appliance). For example, such IoT devices may communicate with the video communication application via the Internet or directly, e.g., via short-range wireless communication or a wired connection. The video communication application may transmit identifiers indicative of an object type (e.g., whether the device is a chair, table, robot vacuum, exercise equipment, thermostat, security camera, lighting system, dishwasher, or any other suitable device, or any combination thereof) and/or an orientation and location of the object. The video communication application may build an inventory of objects (e.g., indications of locations and corresponding classifications of household items, or any other suitable objects, or any combination thereof) and corresponding locations of the objects in environment 116. Such inventory and corresponding location may be stored in association with one or more of the data structures (e.g., stored at a user device and/or server 404 and/or database 405 of FIG. 4 or any other suitable device or database). The video communication application may generate a data structure for a current field of view of the user, including object identifiers associated with objects in environment 116, and such data structure may include coordinates representing the position of the field of view and objects in environment 116.

In some embodiments, user device 104 and any other suitable devices associated with the video communication system, networking equipment (e.g., a router, a modem, a switch, an access point, or any other suitable device or any combination thereof), and/or any suitable IOT device, may be equipped with antennas for transmitting and receiving electromagnetic signals. Such signals may be transmitted and received at frequencies within the electromagnetic spectrum, e.g., radio frequencies, to communicate with each other over a network in a localized area. The network may correspond to, e.g., a Wi-Fi network, such as, for example, 802.11n, 802.11ac, 802.11ax, or Wi-Gig/802.11ad, or any other suitable network, or any combination thereof. The devices or objects of environment 116 may communicate wirelessly over a wireless local area network (WLAN) and with the Internet, and may be present within an effective coverage area of the localized network, e.g., a home network or enterprise network. The Internet may include a global system of interconnected computer networks and devices employing common communication protocols, e.g., the transmission control protocol (TCP), user datagram protocol (UDP) and the internet protocol (IP) in the TCP/IP internet protocol suite. In some embodiments, the objects and devices of environment 116 may communicate via a short-range wired or wireless communication technique (e.g., Bluetooth, RFID, NFC, or any other suitable technique, or any combination thereof). In some embodiments, the video communication application may identify classifications and/or locations of objects in environment 116 based on determined wireless signal characteristics, e.g., channel state information (CSI), received signal strength indicator (RSSI) and/or received channel power indicator (RCPI). Such aspects are discussed in more detail in Doken et al., application Ser. No. 17/481,931 filed Sep. 22, 2021, the contents of which are hereby incorporated by reference herein in their entirety.

As shown in FIG. 1B, user 102 may desire, e.g., prior to or during a video communication session, to replace at least a portion of environment 116 with XR portion 108 in the video feed to be transmitted to other video communication session participants (and/or displayed at user device 104 of user 102). For example, the video communication application may determine that virtual background 108 should be included in a video feed of the video communication session, e.g., based upon receiving selection of virtual background 108 or based upon user preferences or a user profile of user 102. The video communication application may be configured to generate for display user interface element 128, to permit device 104 (e.g., the encoding or sending device) to enable the user to control XR insertion into the video feed. Specifically, the user interface element 128 may enable user 102 to selectively specify whether one or more entities in environment 116 should not be occluded by the XR portion (e.g., virtual background 108, or any other suitable XR element) in the video feed. The user may specify that such entity(ies) instead should be blended into the video feed comprising depiction 112 of user 102 and/or comprising other portions that include XR portion 108 (e.g., portions of the video feed at which no entities are detected). In some embodiments, such as if a virtual background is not selected or regardless of whether the virtual background is selected, UI element 128 may permit a user to select different XR portions or other imagery and specify particular portions of environment 116 at which such XR portions or imagery should be depicted in the video feed.

In some embodiments, user interface element 128 may be configured (by the system or by the user) to be displayed in any suitable manner, e.g., at a portion of the display of user device 104 where other video communication session participants were or will be displayed, at a portion of the display of user device 104 depicting user 102. Additionally or alternatively, the user interface element 128 may be configured to be displayed at a mobile device of user 102 (e.g., when device 104 is a non-mobile device and/or if multiple devices of user 102 are in proximity), or in any other suitable manner, or any combination thereof. In some embodiments, user interface element 128 may enable user 102 to specify that only certain users taking part in the video communication session should be permitted to view one or more entities, e.g., a user may desire to share entities in his or her environment with only other user's he or she knows. In some embodiments, user interface element 128 may provide a user with the option of causing certain entities to be displayed at his or her device, but not at other devices. As an example, user 102 may wish to monitor the location of his or her dog, or his or her child, or an autonomous home vacuum cleaner or any other suitable object, without notifying other users that the dog or child is in the background.

Figure 1C:
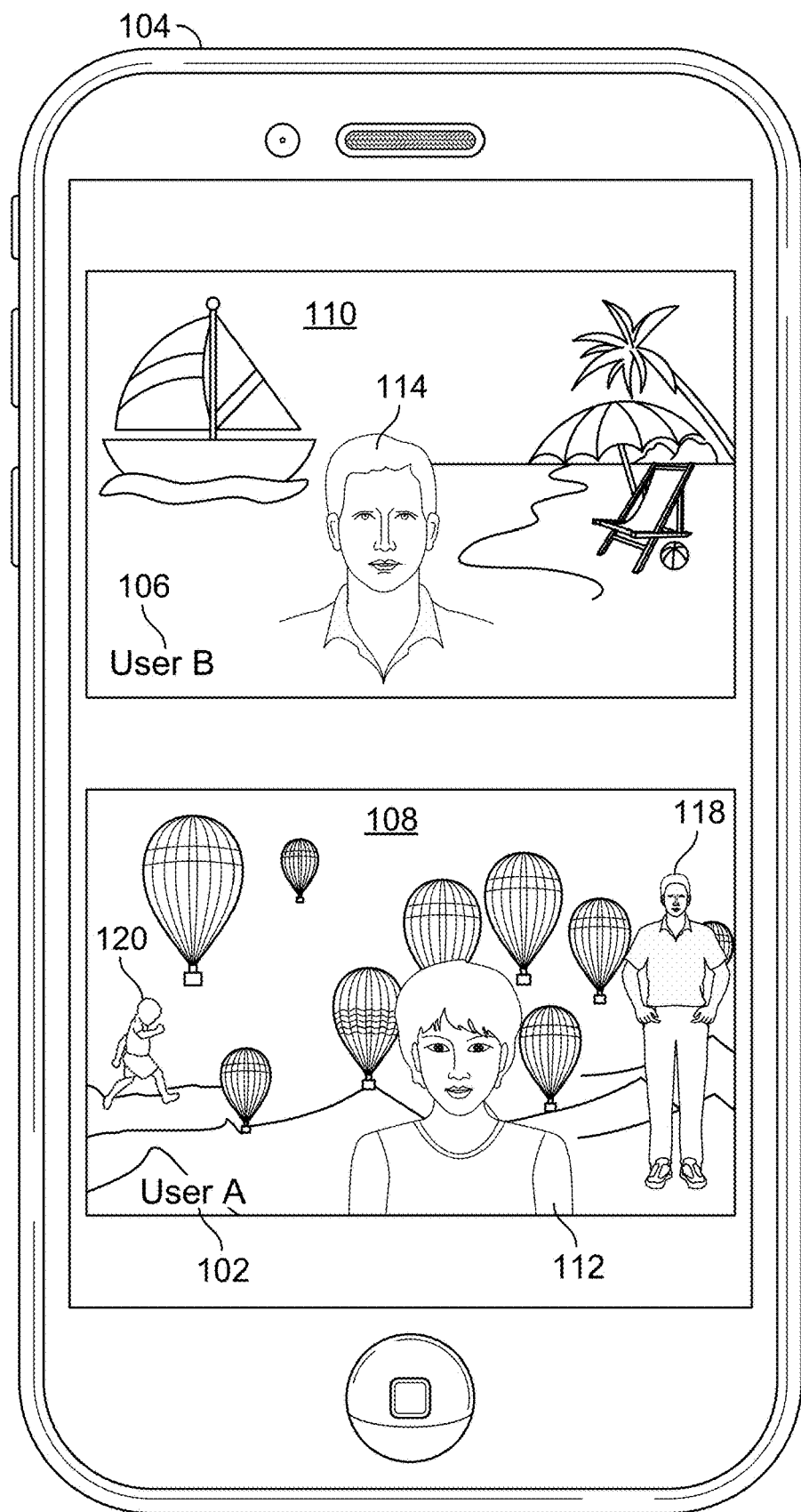

In some embodiments, user interface element 128 may comprise a slider menu to enable user 102 to choose which entities should not be occluded by XR portion 108 and thus should be blended into the video feed provided to other video communication session participants. Such a slider menu may be configured to enable the user to specify his or her choice(s) by adjusting icon 130 to different positions of the slider menu. For example, selection of option 132 may cause a full static virtual background to be presented, e.g., all of the video feed provided via user device 104 may be occluded by XR portion 108, or the only portion of the video feed not occluded by XR portion 108 may be depiction 112 of user 102 (as shown in FIG. 1A). Selection of option 136 may cause each detected person (e.g., person 118 and person 120) in background 116 not to be occluded by XR portion 108 and therefore blended into the video feed (as shown in FIG. 1C). For example, the video communication application may be configured to insert the XR portion 108 at all portions of the background other than portions of the background that correspond to a mask of the selected entity. For example, the video communication application may cause the XR not to be inserted at the portion of the background at which the mask defining the boundaries of person 118 is located, and/or not to be inserted at the portion of the background at which the mask defining the boundaries of person 120 is located. Additionally or alternatively, user interface element 128 may enable user 102 to granularly specify which of the multiple persons or users 118, 120 should not be occluded by XR portion 108 and thus should be included in the video feed (as shown in FIG. 1G).

Figure 1D:
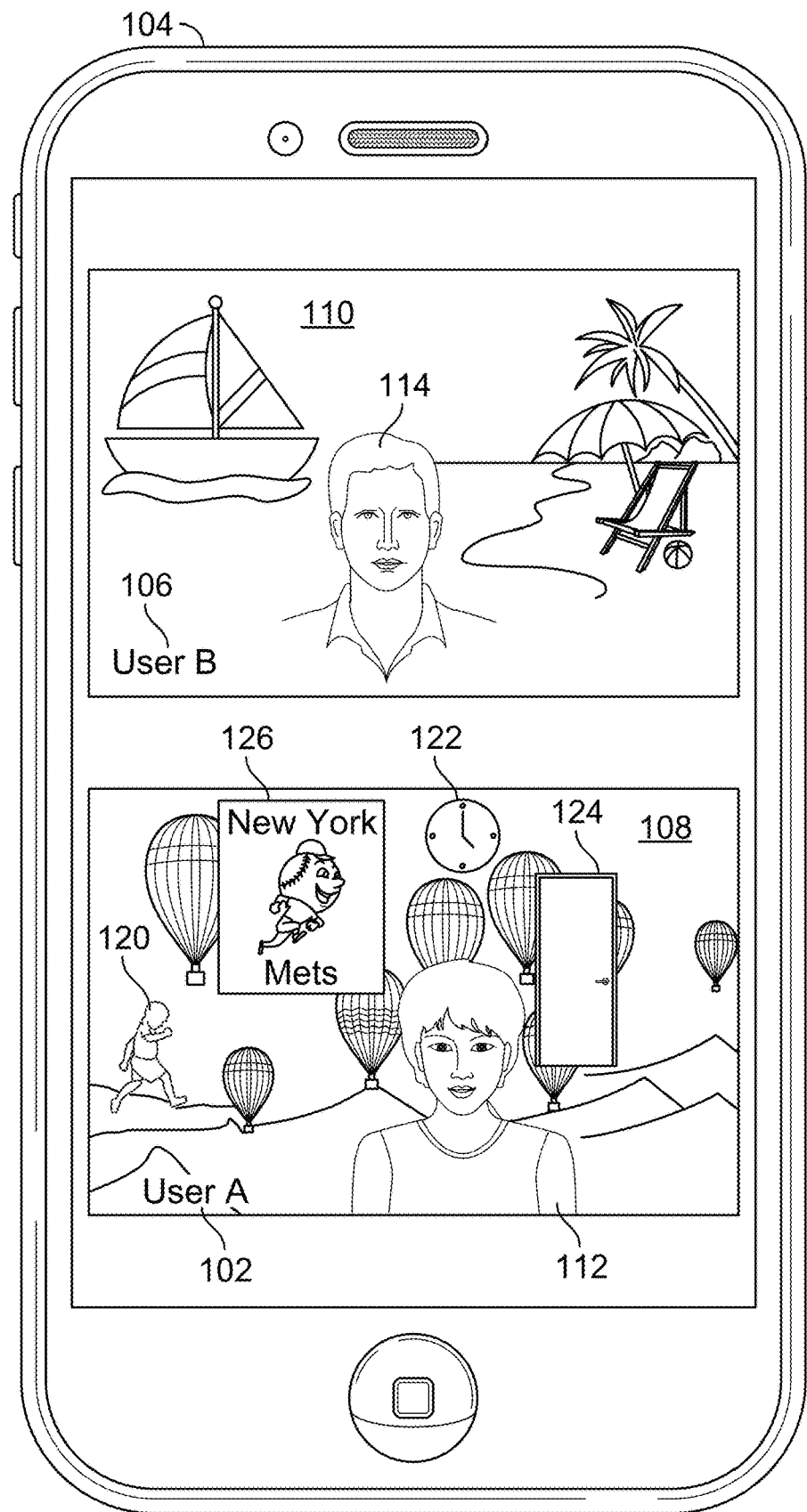
Figure 1E:
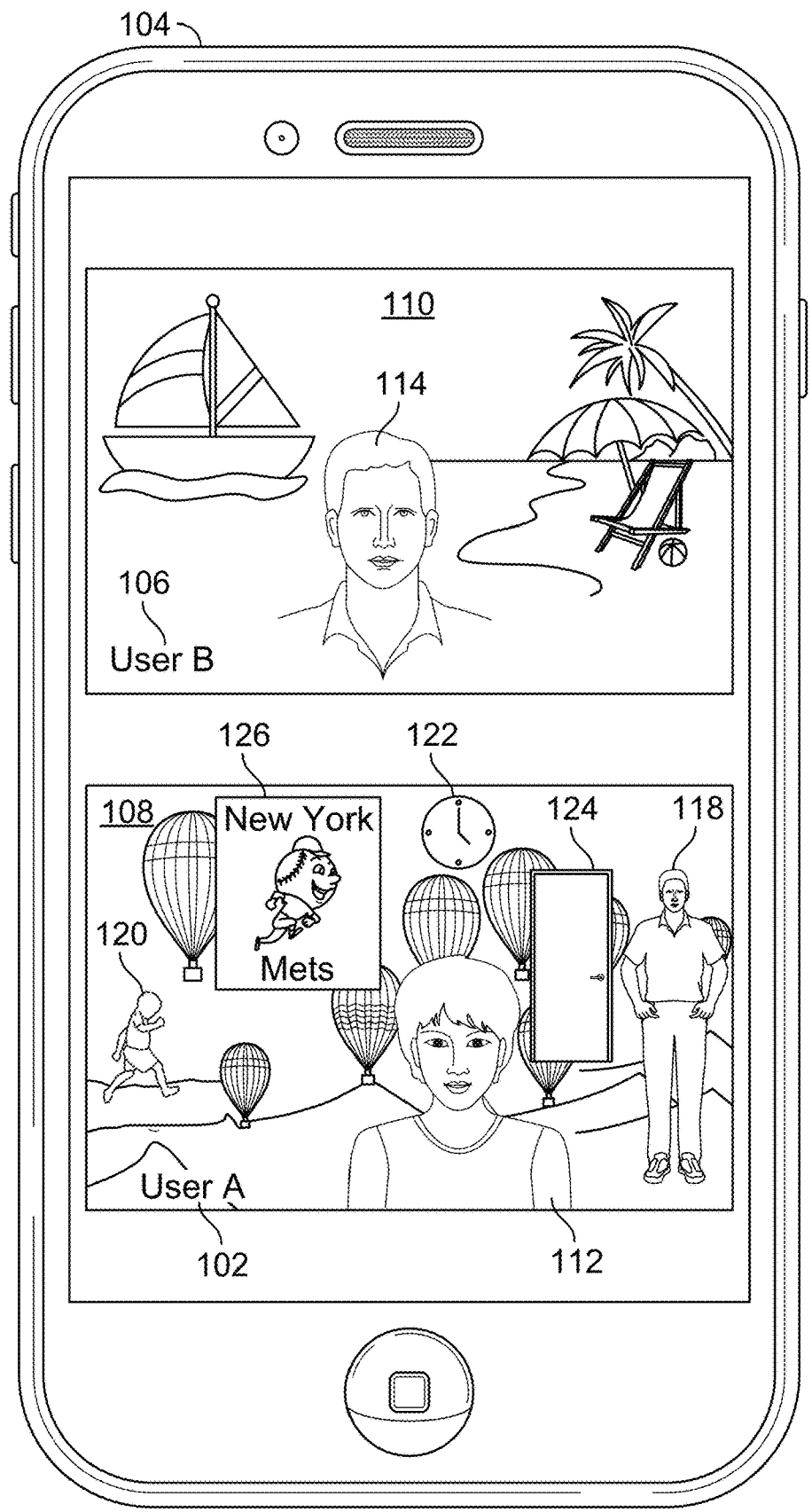
Figure 1F:
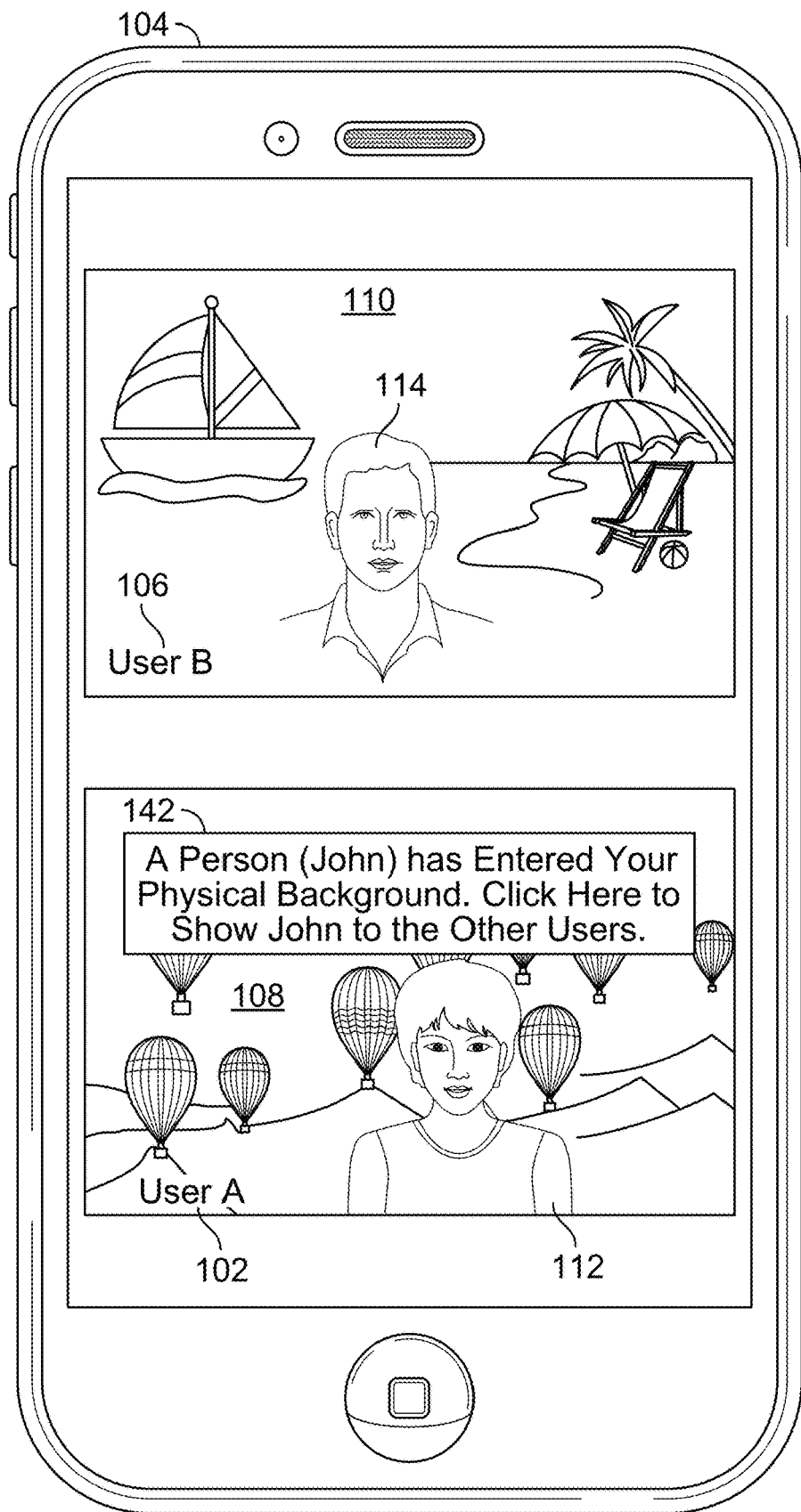
Figure 1G:
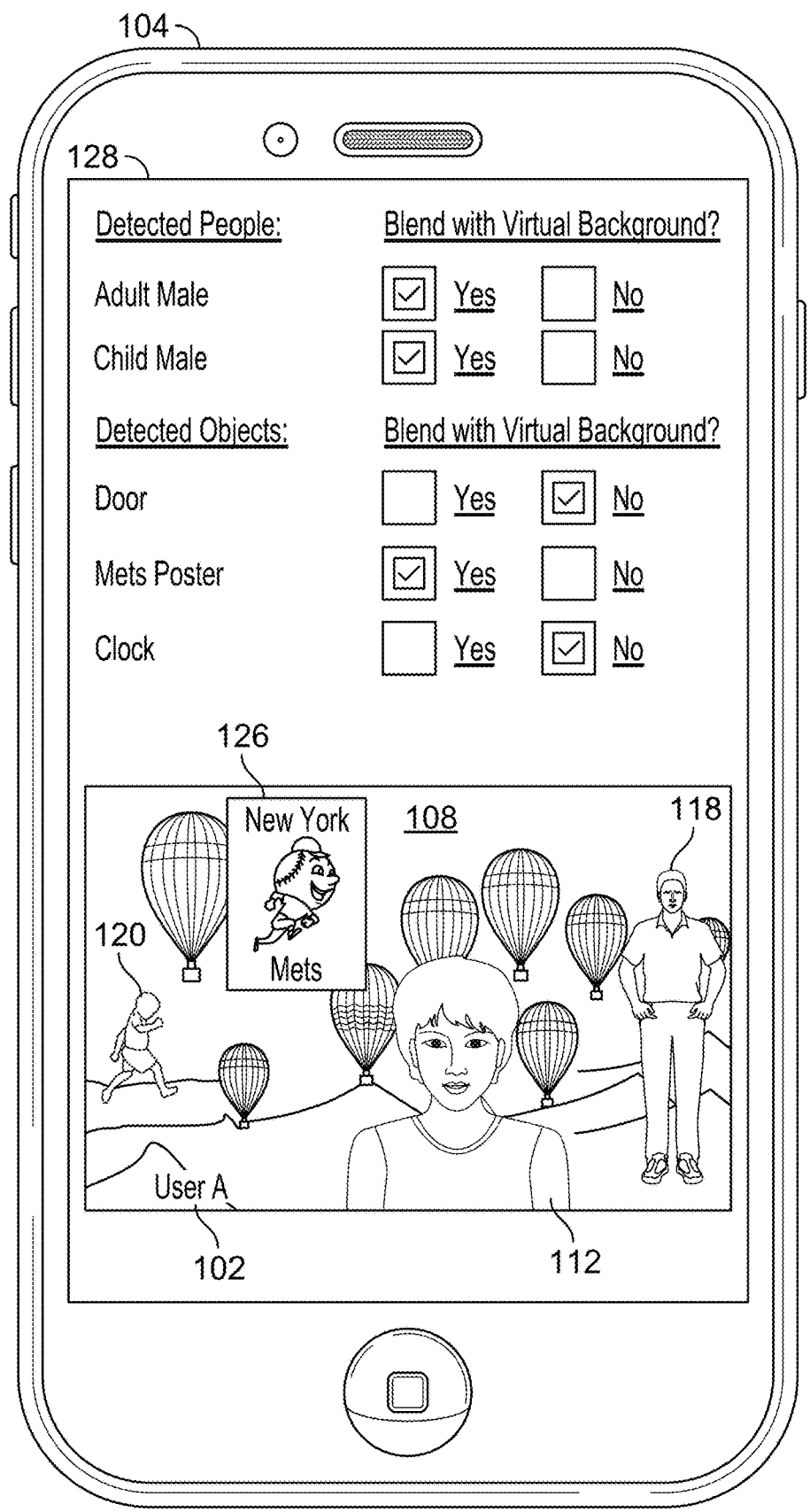

Selection of option 138 may cause each detected object (e.g., clock 122, door 124, poster 126) in background 116 not to be occluded by XR portion 108 and therefore blended into the video feed (as shown in FIG. 1D). For example, the video communication application may be configured to insert the XR portion 108 at all portions of the background other than portions of the background that correspond to a mask of a detected object. That is, the video communication application may be configured not to insert the XR portion at the portion of the background at which the mask defining the boundaries of clock 122 is located, and/or not to be inserted at the portion of the background at which the mask defining the boundaries of door 124 is located. As another example, the video communication application may cause the XR portion not to be inserted at the portion of the background at which the mask defining the boundaries of poster 126 is located. Additionally or alternatively, user interface element 128 may enable user 102 to granularly specify which of the multiple objects 122, 124, 126 should not be occluded by XR portion 108 and thus should be included in the video feed (as shown in FIG. 1G). In some embodiments, the video communication application may cause a portion of the video feed surrounding a specified entity not to be occluded by XR portion 108. For example, it may be desirable to show a predefined portion (e.g., specified by the system or the user) of a wall or floor or other portion of the environment near poster 126 or near user 118 to avoid the appearance that such entity is floating.

Selection of option 132 may cause no virtual background 108 to be included in the video feed, and may cause only the actual physical environment 116 behind user 102 and the depiction 112 of user 102 to be included in the video feed. Selection of option 134 may cause each detected object (e.g., clock 122, door 124, poster 126) and each detected person (e.g., person 118, person 120) not to be occluded by XR portion 108 and thus blended into the video feed (FIG. 1E). Alternatively, user interface element 128 may enable user 102 to granularly specify which of the multiple persons and/or objects should not be occluded by XR portion 108 and thus blended into the video feed (as shown in FIG. 1G).

While user interface element 128 is shown as a slider bar in FIG. 1B, any suitable user interface arrangement may be employed, e.g., drop-down menus, radio buttons, selectable icons, filters, etc. Additionally or alternatively, the video communication application may enable the user to select a depicted entity directly (e.g., selecting the displayed indication of person 118 via a touch screen), or provide a voice command or voice request regarding a particular entity, to indicate that such entity should not be occluded by the XR portion 108 and thus should be blended into the video feed. In some embodiments, the video communication application may perform detection of one or more entities, and blend such one or more entities into the video feed (e.g., along with depiction 112 of user 102 and XR portion 108 at different portions of the displayed video feed). Such actions may be performed response to receiving selection of an option of user interface element 128, and/or in response to receiving a voice command (e.g., "Show my Christmas tree") and/or in response to detecting an entity.

In some embodiments, the video communication application may enable the user to specify, during a setup or configuration phase, what particular objects (from their physical background) to choose to include with the blending of the virtual background. For instance, a user may have a particular ornament (e.g., poster 126 of the New York Mets baseball team) in his or her room that he or she wants to be visible during the video communication session (e.g., to show his or her fanhood or prompt conversations with other users) or to act as a reminder (e.g., clock 122 and/or door 124). The video communication application may enable the user to specify that such entities should not be occluded by the inserted or to-be-inserted XR portion 108, and instead should be included in his or her camera view.

In some embodiments, the video communication application may enable the user to, dynamically during an ongoing video or other media communication session, indicate that a particular object (e.g., poster 126) should be excluded from the XR processing and presented. For example, such presentation may enable the user to show other users that he or she is a fan of the Mets baseball team, if that topic begins being discussed. As another example, the video communication application may receive input to occlude user 102, e.g., if user 102 is eating and wants his or her depiction to be temporarily occluded from the video feed. In some embodiments, the video communication application may automatically perform such adjustments, or provide a suggestion to perform such adjustments or suggest which entities should or should not be occluded by XR portion 108, based on performing audio and/or visual processing of a current frame. For example, the video communication application may utilize any of the aforementioned techniques to process frames of the user to determine he or she is eating (and thus automatically occlude the user with XR portion 108 or recommend that the user select this option). As another example, the video communication application may process audio of the video communication session to determine that baseball is being discussed (and thus automatically remove or provide a suggestion to remove the occlusion of poster 126). To dynamically choose, or choose during the setup phase, whether a certain entity should be occluded or should not be occluded by XR portion 108, the video communication may perform any suitable technique. For example, the video communication application may be configured to cause a segmentation algorithm to focus on the video feed for that particular object and generate a mask (or use an existing CNN and/or other model) for that object/object type, which can enable the one or more specified entities to be mixed into the final background/foreground mask.

In some embodiments, the user may indicate to the video communication application that he or she will be using a particular object (e.g., a product he or she is displaying for sale during the video communication session), Additionally or alternatively, the user may indicate to the video communication application that he or she plans to hold the particular object at a particular location and/or depth (e.g., in the foreground, near the camera and in the user's hands) during the video communication session. For example, the user may be in his or her basement, and may not want the other users to see the basement, but wants them to see the object being demonstrated for sale. The video communication application may prompt the user to hold up the object at such location and/or search for an image of the object (e.g., in a database and/or online) such that the video communication application may identify the particular object when it is brought out by user 102 during the video communication session.

As shown in FIG. 1G, user interface element 128 may comprise, in some embodiments, options to enable the user to granularly specify, for each respective detected entity, whether such entity should not be occluded by XR portion 108 and should be blended with XR portion 108. For example, user 102 may indicate via any suitable input (e.g., tactile, voice, biometric, or any other suitable input, or any combination thereof) that adult male 118 and child 120 should not be occluded by XR portion 108, poster 126 should not be occluded by XR portion 108, door 124 should be occluded by XR portion 108 and clock 122 should be occluded by XR portion 108.

Figure 1H:
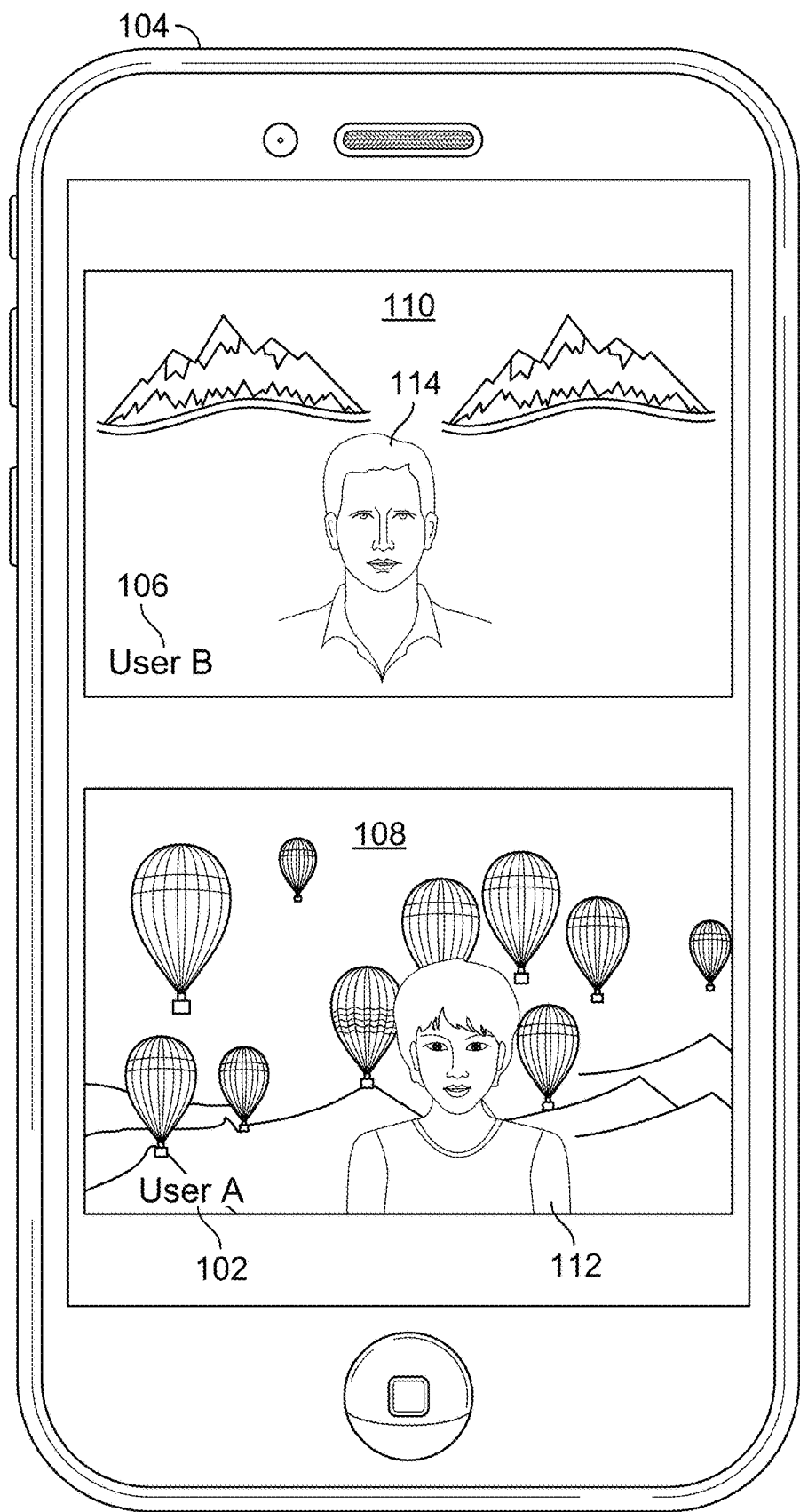

In some embodiments, a user on the receiving or rendering end of a video feed may be permitted to control XR insertion with respect to transmitting the user's XR portion, e.g., modify an appearance of the environment of another user in the video communication session. For example, user 102 may be permitted to modify XR portion 110 associated with user 106 from a beach scene (FIG. 1C) to a mountainous scene (FIG. 1H). In some embodiments, user interface element 128 or any other suitable user interface element may be provided to enable the user to specify such preferences. As another example, if user 106 is not a fan of the New York Mets, he or she could specify that poster 126 should be modified to be a New York Yankees poster. For example, the video communication application may receive a selection from among predefined XR portions or other images, and/or may allow a user to upload an XR portion or image for insertion into another user's background (and/or his or her own background). In some embodiments, the video communication application may enable the user to specify multiple XR portions or multiple images to blend or mix or otherwise include at multiple portions of his or her video or another user's video feed for any suitable number of users. The video communication application may, upon receiving such a user request, decode a video feed received at a particular user device, and modify the video feed based on the requested changes. For example, the video communication application may process XR portions and/or entities included in the received video feed such as, for example, by performing image segmentation techniques described above, and generating such modified video feed for display. In some embodiments, a user may be provided with an option to cause one or more other users taking part in the video communication session to match his or her personal background including any XR portions and/or entities. In some cases, such image segmentation techniques may be computationally intensive, and it may be desirable for the video communication application to offload such processing to other devices or servers. Such aspects are discussed in more detail in Doken et al., application Ser. No. 17/545,318 filed Dec. 8, 2021, the contents of which are hereby incorporated by reference herein in their entirety.

In some embodiments, certain types of devices (e.g., older devices, and/or devices running outdated software) may lack the processing capabilities to implement XR portions, but may be otherwise able to participate in a video communication session facilitated by the video communication application. The video communication application may determine a type of a device, which may be understood as a grouping of devices distinguished by a common characteristic from other devices. For example, a type of device may refer to a type of consumer electronic (e.g., whether the device is a television, a tablet, a personal computer, a mobile device such as, for example, a tablet or a smartphone, a virtual reality of AR device, etc.). In another example, the type of device may refer to the capabilities of the device, e.g., whether or not a particular device can output audio and/or video; how quickly, if at all, content may be downloaded to the device; the power connection and/or battery life; whether or not the device is a mobile device; the resolution, codecs, formats, etc., supported by the device; and/or any other characteristic of a user device that may be relevant. In some embodiments, the video communication application may cause a user device to transmit, to a remote server running the video communication application, an indication of a type of user device 104. For example, such indication may be a device identifier, which may be a descriptive attribute such as, for example, at least one of the device name, device type, model number, serial number, manufacturer name, battery life, etc. For example, if a manufacturer of user device 104 is Google, the name of the device is Pixel XL, the model number is 2 and the serial number is 12345, the device identifier may be "Google Pixel XL 2, 12345." Based on such information, the video communication application may determine that user device 104 corresponds to a mobile device (e.g., a smartphone).

The video communication application may determine, based on the device type, that a particular user device is not capable of performing processing to insert an XR portion and/or the particular user device can only perform a subset of the options provided by user interface element 128. Based on this determination, a reduced or modified set of options may be provided (e.g., only options 132, 138 and 140 may be provided if the device type suggests that only stationary objects can be detected at that particular user device), and/or the particular device may provide an indication of only the entities that it is capable of tracking. Additionally or alternatively, the video communication application may be configured to enable the device to offload processing to a remote server or other device to perform processing it is incapable of performing.

In some embodiments, ambient conditions of environment 116 may be taken into account by the video communication application in performing insertion of one or more XR portions and/or determining one or more portions of a background that should not be occluded by the one or more XR portions. For example, the video communication application may employ or be in communication with a camera or photodetector that is configured to sense a quantity of ambient light present in the vicinity of, or incident to, a screen of user device 104. In some embodiments, if low ambient light is detected (e.g., when a device is located in a basement), the current XR portion may be modified, e.g., to make it appear shinier, or a different XR portion may be inserted, or a recommendation to insert such different XR portion may be provided. If a high amount of ambient light is detected (e.g., if a device is located next to a window during a sunny day), the video communication application may automatically apply, or recommend to apply, a suitable XR portion, e.g., a romantic or darker background to provide better clarity under the current conditions. In some embodiments, whether an ambient light amount is considered high or low may be determined by comparing the ambient light amount to a threshold set by system or user, and/or based at least in part on historical information of virtual backgrounds used in different ambient light conditions by the user or other users. In some embodiments, the video communication application may perform actions with respect to masks of different entities based on the ambient lighting. For example, the video communication application may determine that ambient lighting is negatively impacting the appearance of the user's video feed or a portion thereof (e.g., in which an XR portion is inserted). In such instance, the video communication application may automatically modify the video feed, or provide a suggestion to modify the video feed, such that one or more entities located within a vicinity of the negatively impacted area should not be occluded.

In some embodiments, one or more masks may be generated corresponding to one or more depths in a particular environment or field of view. For example, the video communication application may enable a user to specify (e.g., via user interface element 128) a particular depth, and any entities at the specified depth may be caused not to be occluded by the XR portion. As an example, the video communication application may enable a user to selecting a short depth at which a user may hold up any object, and the video communication application may decline to occlude such object with the XR portion. For example, the video communication application may interpret such holding up of the object as an indication that the user is holding up something to be shown and that should not be occluded by the XR portion. In some embodiments, any suitable sensor (e.g., a proximity sensor) may be employed to ascertain a distance of one or more detected entities at respective depths relative to a camera of user device 104 or relative to user 102, e.g., the main participant in environment 116, and associated with user device 104. This may be performed while such entities are visible or invisible (e.g., occluded by XR portion 108) in the video feed. In some embodiments, such other entities may be ordered by depth as perceived by a camera of user device 104. In some embodiments, the video communication application may be configured to receive an instruction that entities or other portions of an environment at a particular depth behind user 102 should not be occluded by the XR portion, e.g., based on a mask generated at such depth.

In some embodiments, the processes and techniques described above and below may be offered via an Application Programming Interface (API) to developers. For example, software tools (e.g., one or more software development kits, or SDKs) may be provided to any suitable party, to enable the party to implement the functionality of selectively determining that one or more entities should not be occluded by an XR portion.

Figure 2B:
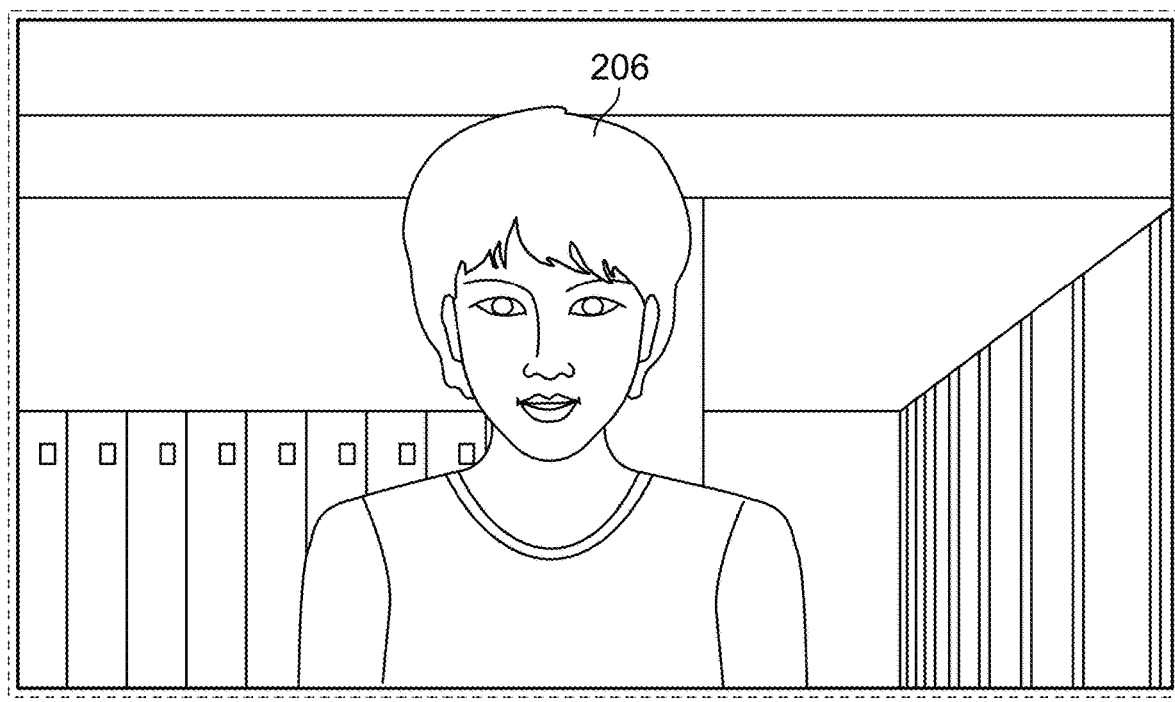

FIGS. 2A-2B show an illustrative scenario in which a system for enabling user-controlled extended reality may be implemented, in accordance with some embodiments of this disclosure. In some embodiments, the aforementioned techniques may be applicable for XR applications that run on smart phones or near-eye displays (e.g., AR glasses, AR head-mounted display (HMD), virtual reality (VR) HMD or any other suitable computing device, or any combination thereof). For example, in environment 201, user 202 may be wearing near-eye display device 204, in which a video feed may be recorded via a device's back camera or other camera external to near-eye display device 204 and proximate user 202 in environment 201. In some embodiments, such near-eye display device 204 may or may not encode video for transmission to other video communication session participants (e.g., user 206 of FIG. 2B), and/or may be configured to mix and locally render video during the video communication session. As an example, the video communication application may receive, from user 202 wearing near-eye display device 204, an indication to focus on a specific entity (e.g., an object or a person) that is in the field of view of user 202, e.g., by applying or receiving a request associated with applying diminished reality techniques (e.g., using a virtual background, to make certain entities or portions thereof invisible or transparent or otherwise replace or modify the entity or portion thereof with another image or color), such as, for example, based on a selection of an option associated with user interface element 128. In some embodiments, near-eye display device 204 may be transparent or partially transparent, such that the user may be able to see the field of view of his or her physical environment directly through near-eye display device 204. Alternatively or additionally, the video communication application may provide an image of the user's environment on a display screen of another device. Objects that are behind a user may not appear in a field of view of the user wearing near-eye display device 204, and the near-eye display device 204 may be configured to modify one or more portions of an environment perceived by the user.

A field of view may be understood as a portion of an environment (real or virtual or any suitable combination thereof) that is captured by a camera of a user device at a given time, and/or presented to the user at a given time by the user device (e.g., an angle in a 360-degree sphere environment, or any suitable number of degrees). In some embodiments, the field of view may comprise a pair of 2D images to create a stereoscopic view in the case of a VR device; in the case of an AR device (e.g., smart glasses), the field of view may comprise 3D or 2D images, which may include a mix of real objects and virtual objects overlaid on top of the real objects using the AR device (e.g., for smart glasses, a picture captured with a camera and content added by the smart glasses). If an XR environment has a single degree of liberty, e.g., a rotation of 360 degrees, any field of view may be defined by either the edge angular coordinates (e.g., +135 degrees, +225 degrees) or by a single angular coordinate (e.g., −55 degrees) combined with the known angular opening of the field of view. If an XR environment has six degrees of liberty, say three rotations of 360 degrees and three spatial positions, any field of view may be defined by three angular coordinates and three spatial coordinates. A field of view may therefore be understood as a portion of an environment displayed when the user is at a particular location in the environment and has oriented the display device in a particular direction.

In the example of FIG. 2A, the video communication application may facilitate a video communication session between near-eye display device 204, associated with user 202, and a user device associated with user 206 (FIG. 2B). A video feed of user 202 may be captured via a front-facing camera coupled to near-eye display device 204 and/or an external camera (e.g., a security camera or an enterprise camera positioned at a particular location in environment 201) for transmission via a networked server to user 206. Environment 201 may be cluttered, such that if the user sees the field of view of his or her physical environment 201 directly through near-eye display device 204, the user may be distracted by the clutter and may struggle to concentrate. For example, a video feed of user 206 participating in the video communication session may be shown at a particular portion of near-eye display device 204 to user 202, but user 202 may nonetheless be distracted by other portions of environment 201 visible at other portions of near-eye display device 204. The video communication application may provide an option (e.g., via a user interface element 128) that is selectable by user 202 to apply an XR portion to span the full field of view of user, or a majority of the field of view, of user 202 via near-eye display device 204, e.g., to block out clutter in environment 201 with an office-like virtual background. Such features may enable user 202 to better focus on the ongoing video communication session in order for the user to be able to focus and converting environment 201 (e.g., a kitchen-like space) to a business space. In some embodiments, user 202 may be provided with an option to expand an XR portion received via the server from a user device of user 206 (e.g., another near-eye display device, or any other suitable device) to span the full field of view of near-eye display device 204 or a majority of the field of view of user 202 via near-eye display device 204. In some embodiments, the video communication application may generate and utilize a mask corresponding to edges or a border of a depiction of user 206 to determine which portions an XR portion should not be inserted. For example, the XR portion may be inserted at all portions of the field of view of near-eye display device 204 other than the portions corresponding to the mask of user 206.

In some embodiments, during the video communication session, the video communication application may be configured to detect whether one or more entities in environment 201 move into a field of view of user 202 via near-eye display device 204, e.g., from the perspective of user 202, behind user 206 in his or her field of view. In some circumstances (e.g., depending of the setting selected via the user input received in connection with user interface element 128), such one or more detected entities may be included in the field of view of user 202 via near-eye display device 204, using the techniques described herein. In some embodiments, the video communication application may utilize depth-sensing techniques (e.g., a LiDAR scanner on a smartphone and/or smart glasses, a front-facing camera, and/or any other suitable sensor or technique) to map movement occurring within environment 201. Such techniques may additionally or alternatively be sued to map specific objects or persons in physical environment 201, and may be used to update the virtual background accordingly. In some embodiments, a user 202 may not indicate via user interface element 128 or another input that detected entities in environment 201 should not be occluded by the XR portion of the video feed. Nonetheless, the video communication application executing at least in part on near-eye display device 204 may detect a person or object approaching user 202, and may update the XR portion being rendered. For example, the video communication application executing at least in part on near-eye display device 204 may override the XR portion and overlay such one or more detected entities while filling out the field of view of near-eye display device 204. In some embodiments, if the conversation is a video call, the video communication application may cause the XR portion transmitted via a user device of user 206 to span the entire field of view of near-eye display device 204, to cover the physical environment behind the glass.

In some embodiments, XR portion selection and/or selections of options of user interface element 128 may be received via user device 204 or any other suitable device (e.g., a smart watch, a laptop, etc.). In some embodiments, XR portions may not be specifically chosen by the user, and/or may be selected at least in part based on ambient conditions of environment 201. Such ambient conditions may comprise, e.g., location, lighting, determining 3D Geometric characteristics, and/or may be application dependent as dynamically detected by sensors of near-eye display device 204 (six degrees of freedom, eye tracking, camera, etc.) and/or counter-party recognition (object/person), or any other suitable technique, or any combination thereof. In some embodiments, a receiving device (e.g., user device 204 or any other suitable receiving device) may ignore an XR portion being transmitted by a user device of user 206 participating in the video communication session. In such an instance, the receiving device may still apply its local preferred XR portion, as well as ignore any settings (e.g., user interface element 128 setting specified by user 206) of user 206 slider settings and apply its own settings specified via user interface element 128. In some embodiments, user 206 may be required to consent to enabling user device 204 to ignore his or her XR portion and/or user interface element settings. For instance, if the sender device of user 206 is tracking one or more other entities other than the main participant (user 206) and blending such detected one or more entities to the encoded XR portion, receiving device 204 can filter such blending out during a rendering phase. For example, rendering device 204 can implement one or more of the techniques or algorithms described above and below, and may instead utilize its own preferences and/or settings. In some embodiments, after decoding the received video stream (received from a user device of user 206), the video communication application may reconstruct the video stream. Such stream may be reconstructed using preferred preferences of settings of the user, which may include re-segmenting the main participant/person and/or other entities before inserting the XR portion indicated by the user's preferences.

In some embodiments, as selected by the user, the XR portion may be applied only to a portion of the screen or field of view for a specific planar of the display on the encoding or rendering device, or multiple background images may be applied for the field of view at one time. In some embodiments, the XR portion processing may be overwhelmingly computation- and/or battery-intensive beyond the capability of a near-eye display device or other wearable or mobile device, and hence may be performed at least in part at an auxiliary computing device (e.g., an laptop, smartphone or any other suitable device) or at the edge/cloud data center. In some embodiments, the user may be provided with an indication of how many entities and/or objects and/or persons can be tracked or included within the virtual background based on sensor/computing capability on-device and/or off-device (e.g., at local devices and/or at remote cloud computing resources in communication with the user device). For example, certain entities that cannot be tracked may be grayed out such that the user may be prevented from selecting the grayed out entity (e.g., via user interface element 128).

In some embodiments, the video communication application may be utilized in the context of individual or group content consumption. For example, if a user is consuming content (e.g., streaming a movie) at a public place (e.g., a bus stop) via near-eye display device 204, the video communication application may detect that one or more entities (e.g., other users) have entered or will enter a field of view of the user via near-eye display device 204. For example, the content may be presented at all or a portion of near-eye display device 204, and through other portions of the near-eye display device 204 the user may be able to perceive the physical environment in front of him or her. In this circumstance, the video communication application may pause the content consumption session or otherwise provide a notification concerning the one or more entities approaching the user. In some embodiments, such processing may be performed at near-eye display device 204 or offloaded to another device. The user may specify (e.g., in connection with a user profile or account) whether he or she wants to be fully immersed in content, e.g., not to pause the content or provide a notification, or whether the content should be paused and/or a notification should be provided upon detecting one or more entities (or specific types of entities) in his or her field of view of near-eye display device 204.

In some embodiments, the video communication application may be utilized in the context of recording a video or capturing an image (e.g., for transmission or broadcast in real time, or at a later time, to other users, and/or to be stored at one or more devices). For example, the video communication may enable a user to specify (e.g., as preferences in a profile or other selectable options) that certain entities in a physical background of a user should not be occluded by an XR portion, e.g., such as, for example, a filter or overlay, and/or that certain entities in a physical background of a user should be occluded by the XR portion. The video communication application may enable the user to specify that certain portions of his or her depiction (e.g., a shirt, or hair of the user on his or her head) are permitted to be occluded by the XR portion, e.g., to change colors of certain articles of clothing or apply different colors to his or her hair.

Figure 3:
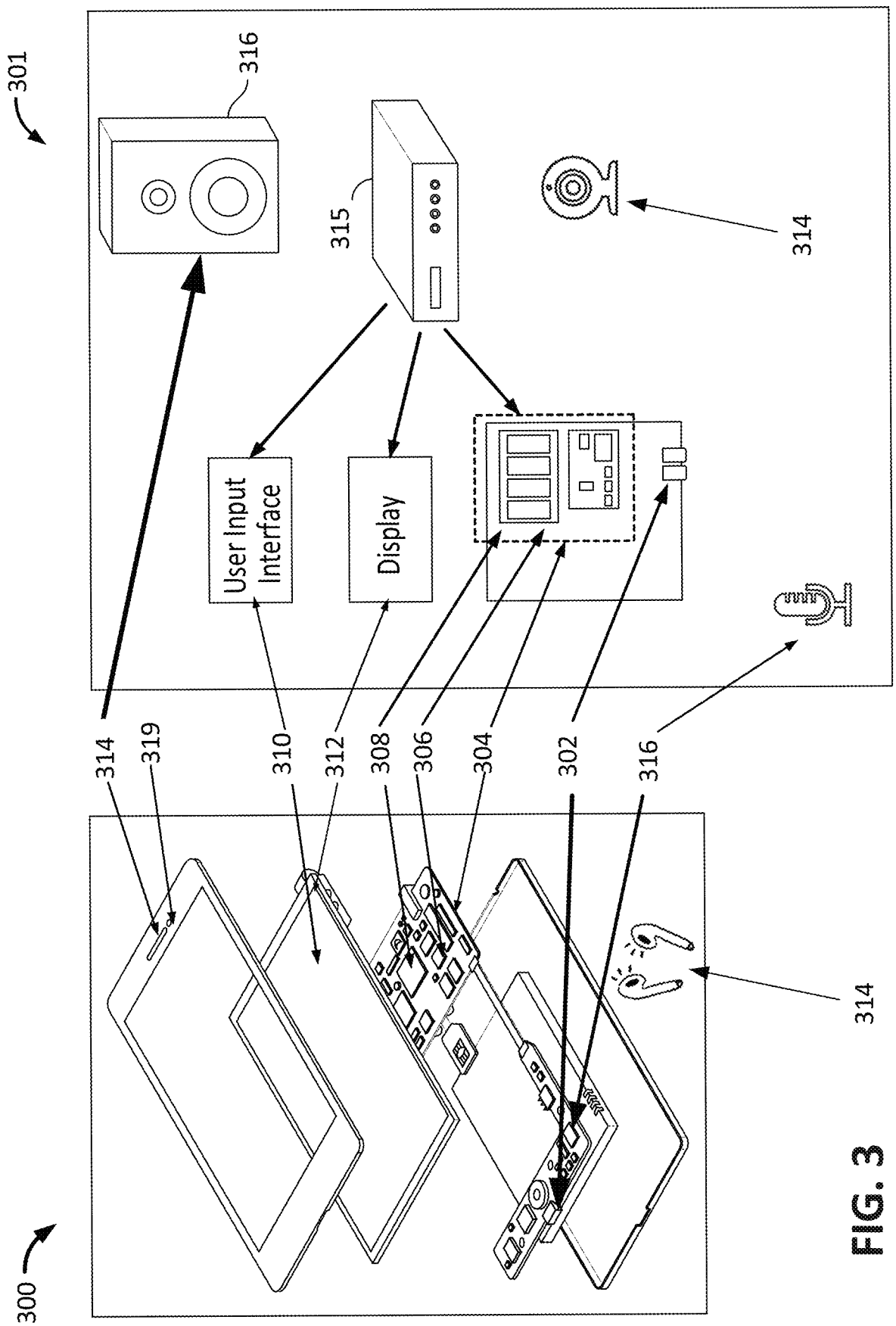
FIG. 3 shows an illustrative user device, in accordance with some embodiments of this disclosure.

FIGS. 3-4 describe illustrative devices, systems, servers, and related hardware for enabling user-controlled extended reality to be implemented, in accordance with some embodiments of the present disclosure. FIG. 3 shows generalized embodiments of illustrative user devices 300 and 301, which may correspond to, e.g., user device 104 and/or user device 204 and/or a user device of user 106 or user 206. For example, user device 300 may be a smartphone device, a tablet, a near-eye display device, a XR (e.g., virtual reality or augmented reality or mixed reality) device, or any other suitable device capable of participating in a video or other media communication session (e.g., in real time or otherwise) over a communication network. In another example, user device 301 may be a user television equipment system or device. User device 301 may include set-top box 315. Set-top box 315 may be communicatively connected to microphone 316, audio output equipment (e.g., speaker or headphones 314), and display 312. In some embodiments, microphone 316 may receive audio corresponding to a voice of a video conference participant and/or ambient audio data during a video conference. In some embodiments, display 312 may be a television display or a computer display. In some embodiments, set-top box 315 may be communicatively connected to user input interface 310. In some embodiments, user input interface 310 may be a remote control device. Set-top box 315 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user devices are discussed below in connection with FIG. 4. In some embodiments, device 300 may comprise any suitable number of sensors (e.g., gyroscope or gyrometer, or accelerometer, etc.), and/or a GPS module (e.g., in communication with one or more servers and/or cell towers and/or satellites) to ascertain a location of device 300. In some embodiments, device 300 comprises a rechargeable battery that is configured to provide power to the components of the device.

Each one of user device 300 and user device 301 may receive content and data via input/output (I/O) path 302. I/O path 302 may provide content (e.g., broadcast programming, on-demand programming, Internet content, content available over a local area network (LAN) or wide area network (WAN), and/or other content) and data to control circuitry 304, which may comprise processing circuitry 306 and storage 308. Control circuitry 304 may be used to send and receive commands, requests, and other suitable data using I/O path 302, which may comprise I/O circuitry. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing. While set-top box 315 is shown in FIG. 3 for illustration, any suitable computing device having processing circuitry, control circuitry, and storage may be used in accordance with the present disclosure. For example, set-top box 315 may be replaced by, or complemented by, a personal computer (e.g., a notebook, a laptop, a desktop), a smartphone (e.g., device 300), an XR device, a tablet, a network-based server hosting a user-accessible client device, a non-user-owned device, any other suitable device, or any combination thereof.

Control circuitry 304 may be based on any suitable control circuitry such as processing circuitry 306. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for the video communication application stored in memory (e.g., storage 308). Specifically, control circuitry 304 may be instructed by the video communication application to perform the functions discussed above and below. In some implementations, processing or actions performed by control circuitry 304 may be based on instructions received from the video communication application.

In client/server-based embodiments, control circuitry 304 may include communications circuitry suitable for communicating with a server or other networks or servers. The video communication application may be a stand-alone application implemented on a device or a server. The video communication application may be implemented as software or a set of executable instructions. The instructions for performing any of the embodiments discussed herein of the video communication application may be encoded on non-transitory computer-readable media (e.g., a hard drive, random-access memory on a DRAM integrated circuit, read-only memory on a BLU-RAY disk, etc.). For example, in FIG. 3, the instructions may be stored in storage 308, and executed by control circuitry 304 of a device 300.

In some embodiments, the video communication application may be a client/server application where only the client application resides on device 300 (e.g., device 104), and a server application resides on an external server (e.g., server 404 and/or server 404). For example, the video communication application may be implemented partially as a client application on control circuitry 304 of device 300 and partially on server 404 as a server application running on control circuitry 411. Server 404 may be a part of a local area network with one or more of devices 300, 301 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 404 and/or an edge computing device), referred to as "the cloud." Device 300 may be a cloud client that relies on the cloud computing capabilities from server 404 to determine whether processing (e.g., at least a portion of virtual background processing and/or at least a portion of other processing tasks) should be offloaded from the mobile device, and facilitate such offloading. When executed by control circuitry of server 404, the video communication application may instruct control circuitry 411 to perform processing tasks for the client device and facilitate the video conference. The client application may instruct control circuitry 304 to determine whether processing should be offloaded. In some embodiments, the video conference may correspond to one or more of online meetings, virtual meeting rooms, video calls, Internet Protocol (IP) video calls, etc.

Control circuitry 304 may include communications circuitry suitable for communicating with a video communication or video conferencing server, edge computing systems and devices, a table or database server, or other networks or servers The instructions for carrying out the above mentioned functionality may be stored on a server (which is described in more detail in connection with FIG. 4). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 4). In addition, communications circuitry may include circuitry that enables peer-to-peer communication of user devices, or communication of user devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as video communication application data described above. Nonvolatile memory may also be used (e.g., to launch a boot-up routine and other instructions). Cloud-based storage, described in relation to FIG. 3, may be used to supplement storage 308 or instead of storage 308.

Control circuitry 304 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 304 may also include scaler circuitry for upconverting and downconverting content into the preferred output format of user 300. Control circuitry 304 may also include digital-to-analog converter circuitry and analog-to-digital converter circuitry for converting between digital and analog signals. The tuning and encoding circuitry may be used by user device 300, 301 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user device 300, the tuning and encoding circuitry (including multiple tuners) may be associated with storage 308.

Control circuitry 304 may receive instruction from a user by way of user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of each one of user device 300 and user device 301. For example, display 312 may be a touchscreen or touch-sensitive display. In such circumstances, user input interface 310 may be integrated with or combined with display 312. In some embodiments, user input interface 310 includes a remote-control device having one or more microphones, buttons, keypads, any other components configured to receive user input or combinations thereof. For example, user input interface 310 may include a handheld remote-control device having an alphanumeric keypad and option buttons. In a further example, user input interface 310 may include a handheld remote-control device having a microphone and control circuitry configured to receive and identify voice commands and transmit information to set-top box 315.

Audio output equipment 314 may be integrated with or combined with display 312. Display 312 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 312. Audio output equipment 314 may be provided as integrated with other elements of each one of device 300 and device 301 or may be stand-alone units. An audio component of videos and other content displayed on display 312 may be played through speakers (or headphones) of audio output equipment 314. In some embodiments, audio may be distributed to a receiver (not shown), which processes and outputs the audio via speakers of audio output equipment 314. In some embodiments, for example, control circuitry 304 is configured to provide audio cues to a user, or other audio feedback to a user, using speakers of audio output equipment 314. There may be a separate microphone 316 or audio output equipment 314 may include a microphone configured to receive audio input such as voice commands or speech. For example, a user may speak letters or words that are received by the microphone and converted to text by control circuitry 304. In a further example, a user may voice commands that are received by a microphone and recognized by control circuitry 304. Camera 318 may be any suitable video camera integrated with the equipment or externally connected. Camera 318 may be a digital camera comprising a charge-coupled device (CCD) and/or a complementary metal-oxide semiconductor (CMOS) image sensor. Camera 318 may be an analog camera that converts to digital images via a video card.

The video communication application may be implemented using any suitable architecture. For example, it may be a stand-alone application wholly-implemented on each one of user device 300 and user device 301. In such an approach, instructions of the application may be stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to provide video conferencing functionality and generate any of the displays discussed herein. Based on the processed instructions, control circuitry 304 may determine what action to perform when input is received from user input interface 310. For example, movement of a cursor on a display up/down may be indicated by the processed instructions when user input interface 310 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 304 may allow a user to provide user profile information or may automatically compile user profile information. For example, control circuitry 304 may access and monitor network data, video data, audio data, processing data, participation data from a conference participant profile. Control circuitry 304 may obtain all or part of other user profiles that are related to a particular user (e.g., via social media networks), and/or obtain information about the user from other sources that control circuitry 304 may access. As a result, a user can be provided with a unified experience across the user's different devices.

In some embodiments, the video communication application is a client/server-based application. Data for use by a thick or thin client implemented on each one of user device 300 and user device 301 may be retrieved on-demand by issuing requests to a server remote to each one of user device 300 and user device 301. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on device 300. This way, the processing of the instructions is performed remotely by the server while the resulting displays (e.g., that may include text, a keyboard, or other visuals) are provided locally on device 300. Device 300 may receive inputs from the user via input interface 310 and transmit those inputs to the remote server for processing and generating the corresponding displays. For example, device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to device 300 for presentation to the user.

In some embodiments, the video communication application may be downloaded and interpreted or otherwise run by an interpreter or virtual machine (run by control circuitry 304). In some embodiments, the video communication application may be encoded in the ETV Binary Interchange Format (EBIF), received by control circuitry 304 as part of a suitable feed, and interpreted by a user agent running on control circuitry 304. For example, the video communication application may be an EBIF application. In some embodiments, the video communication application may be defined by a series of JAVA-based files that are received and run by a local virtual machine or other suitable middleware executed by control circuitry 304. In some of such embodiments (e.g., those employing MPEG-2, MPEG-4, HEVC or any other suitable digital media encoding schemes), video communication application may be, for example, encoded and transmitted in an MPEG-2 object carousel with the MPEG audio and video packets of a program.

FIG. 4 is a diagram of an illustrative system 400 for enabling user-controlled extended reality, in accordance with some embodiments of this disclosure. User devices 407, 408, 410 (which may correspond to, e.g., one or more of user device 104 and/or user device 204 and/or a user device of user 106 or user 206) may be coupled to communication network 409. Communication network 409 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 409) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 4 to avoid overcomplicating the drawing.

Although communications paths are not drawn between user devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user devices may also communicate with each other directly through an indirect path via communication network 409.

System 400 may comprise media content source 402, one or more servers 404, and/or one or more edge computing devices. In some embodiments, the video communication application may be executed at one or more of control circuitry 411 of conferencing server 404 (and/or control circuitry of user devices 407, 408, 410 and/or control circuitry of one or more edge computing devices). In some embodiments, the media content source and/or server 404 may be configured to host or otherwise facilitate video communication sessions between user devices 407, 408, 410 and/or any other suitable user devices, and/or host or otherwise be in communication (e.g., over network 409) with one or more social network services.

In some embodiments, server 404 may include control circuitry 411 and storage 414 (e.g., RAM, ROM, Hard Disk, Removable Disk, etc.). Storage 414 may store one or more databases. Server 404 may also include an input/output path 412. I/O path 412 may provide video conferencing data, device information, or other data, over a local area network (LAN) or wide area network (WAN), and/or other content and data to control circuitry 411, which may include processing circuitry, and storage 414. Control circuitry 411 may be used to send and receive commands, requests, and other suitable data using I/O path 412, which may comprise I/O circuitry. I/O path 412 may connect control circuitry 411 (and specifically control circuitry) to one or more communications paths.

Control circuitry 411 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 411 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 411 executes instructions for an emulation system application stored in memory (e.g., the storage 414). Memory may be an electronic storage device provided as storage 414 that is part of control circuitry 411.

Figure 5:
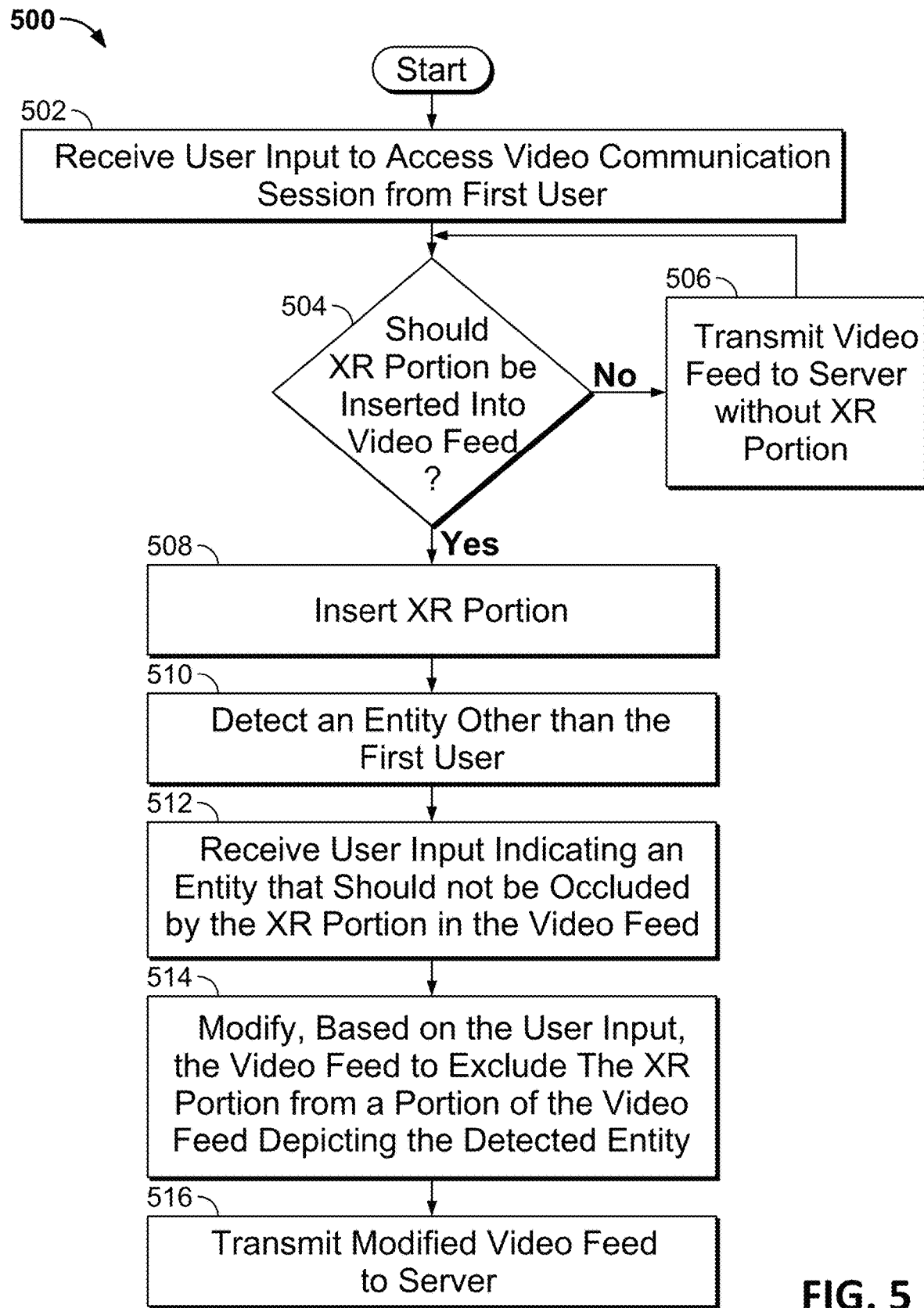
FIG. 5 is a flowchart of a detailed illustrative process for enabling user-controlled extended reality, in accordance with some embodiments of this disclosure.

FIG. 5 is a flowchart of a detailed illustrative process 500 for enabling user-controlled extended reality, in accordance with some embodiments of this disclosure. In various embodiments, the individual steps of process 500 may be implemented by one or more components of the devices and systems of FIGS. 1-4 and may be performed in combination with any of the other processes and aspects described herein. Although the present disclosure may describe certain steps of process 500 (and of other processes described herein) as being implemented by certain components of the devices and systems of FIGS. 1-4, this is for purposes of illustration only. It should be understood that other components of the devices and systems of FIGS. 1-4 may implement those steps instead.

At 502, control circuitry (e.g., control circuitry 304 of user device 300 and/or control circuitry 411 of server 404) may receive user input to access a video communication session from a first user (e.g., user 102 of FIGS. 1A-1G or user 202 of FIG. 2A) at a user device (e.g., user device 104 of FIGS. 1A-1H, or user device 204 of FIG. 2A). For example, such request may be a request to join or create a video conference or video call, which may be pre-scheduled for a certain time or spontaneously generated based on a user request (e.g., a request to commence a video call with one or more other users). In some embodiments, the request to access the video communication session may comprise a request to record a video for transmission or broadcast in real time or at a later time to other users, e.g., posted on a social network application or website or otherwise stored or transmitted.

At 504, control circuitry (e.g., control circuitry 304 of user device 300 and/or control circuitry 411 of server 404) may determine whether an XR portion (e.g., virtual background 108 or any other suitable XR portion or any combination thereof) should be inserted into the video feed. This determination may be made based on whether user input has been received at a current time (e.g., via user interface element 128 or any other suitable input mechanism) or at an earlier time (e.g., specified as part of a user profile or user account for video communication sessions) or automatically (e.g., based on ambient conditions or other detected conditions of the user device or user's physical environment). In response to an affirmative determination at 504, processing may proceed to 508; otherwise processing may proceed to 506.

At 506, the control circuitry may transmit the video feed (e.g., comprising a depiction 112 of user 102 and actual physical background 116 of the environment surrounding user 102) to a server (e.g., server 404 of FIG. 4) without any XR portions. The server may transmit such video feed to one or more other user devices (e.g., a user device of user 106) participating in the video communication session. In some embodiments, the control circuitry (e.g., control circuitry 304 of user device 300 and/or control circuitry 411 of server 404) may perform encoding of the video feed.

At 508, the control circuitry may perform processing to insert an XR portion (e.g., virtual background 108 or any other suitable XR portion or any combination thereof) into the video feed. Alternatively, processing may proceed to 510 prior to performing insertion of any XR portion, or inserting only a subset of the XR portion.

At 510, the control circuitry may detect an entity other than the first user (e.g., depiction 112 of user 102). For example, the control circuitry may employ any suitable technique (e.g., machine learning techniques, segmentation techniques, extracting features of entities for comparison to features of known entities, or any other suitable technique or any combination thereof) to identify and localize any entities (e.g., objects or other persons or any other suitable entity or any combination thereof) present in the environment of the first user. In the example of FIGS. 1A-1H, the control circuitry may detect one or more of user 118, user 120, clock 122, door 124, and/or poster 126. The control circuitry may also utilize one or more of such techniques to detect and localize depiction 112 of user 102.

At 512, the control circuitry may receive user input indicating an entity that should not be occluded by the XR portion in the video feed. In some embodiments, step 510 of detecting one or more entities in the surrounding environment of the user (e.g., in a field of view of a camera of user device 104 or other camera proximate to user device 104) may be performed in response to detecting any suitable triggering event. For example, step 510 may be performed based on receiving such user input, and may be performed regardless of whether an XR portion has been inserted into the video feed. Alternatively, at least one of the entities may be detected prior to receiving the user input at 512.

The user input may be received using any suitable mechanism (e.g., via user interface element 128 or based on preferences specified in a profile or any other suitable mechanism) using any suitable form (e.g., via a touchscreen or other tactile input, a mouse click, a voice command, a biometric input, or any other suitable input or any combination thereof). As an example, the control circuitry may receive (e.g., via I/O circuitry) a selection of option 132 of FIG. 1B, which indicates a desire that each of the detected entities should not be occluded by the XR portion. In some embodiments, an option may be provided that enables a user to specify a particular depth at which entities should not be occluded by the XR portion, e.g., regardless of the type of entity. In some embodiments, multiple options may be selected such that only entities matching each selected option are included in the video feed (e.g., only entities at a particular depth and of a particular type of class of entity), or any entity meeting at least one of the conditions specified by the options is included in the video feed. In some embodiments, the control circuitry may provide, and may be configured to receive input specifying, entities that should be occluded or should not be shown in the actual physical environment surrounding the user. For example, the control circuitry may utilize diminished reality techniques to cause a specified entity (e.g., at a particular depth and/or of a particular type of class) not to be included in the video feed. Additionally or alternatively, the control circuitry may cause the illusion that the entity is not present in the environment (e.g., with an XR portion or other image matching other portions of the environment) or occlude the entity with another type of XR portion. In some embodiments, the control circuitry may determine capabilities of the user device and gray out certain options to prevent the receipt of user input for such options, or may enable offloading of a task associated with the option to a remote device.

At 514, the control circuitry may modify, based on the user input, the video feed to exclude the XR portion (e.g., virtual background 108 or any other suitable XR portion or any combination thereof) from a portion of the video feed depicting the detected entity (e.g., user 118). For example, as shown in FIG. 1C, the control circuitry may cause users 118 and 120 not to be occluded by XR portion 108 and thus blend the depiction of user 118 and user 120 into the video feed. In some embodiments, the control circuitry may generate, and employ, segmentation masks for each detected entity in performing step 514. For example, the control circuitry may utilize such one or more masks to identify portions of the video feed (corresponding to the one or more entities specified by the user input) at which the XR portion should not be inserted. The video feed may further comprise the XR portion included at a different portion of the video feed. For example, in FIG. 1C, virtual background 108 may be included at all portions of the video feed other than depiction 112 of user 102 and the depiction of users 118 and 120, and the depiction of the first user may be included in the video feed (e.g., depiction 112 of user 102 may be included in the video feed).

At 516, the control circuitry may transmit the modified video feed to the server (e.g., server 404 and/or an edge device), and the server may transmit such modified video feed to one or more other user devices (e.g., a user device associated with user 106 participating in the video communication session). In some embodiments, the control circuitry may perform encoding of the modified video feed.

Figure 6:
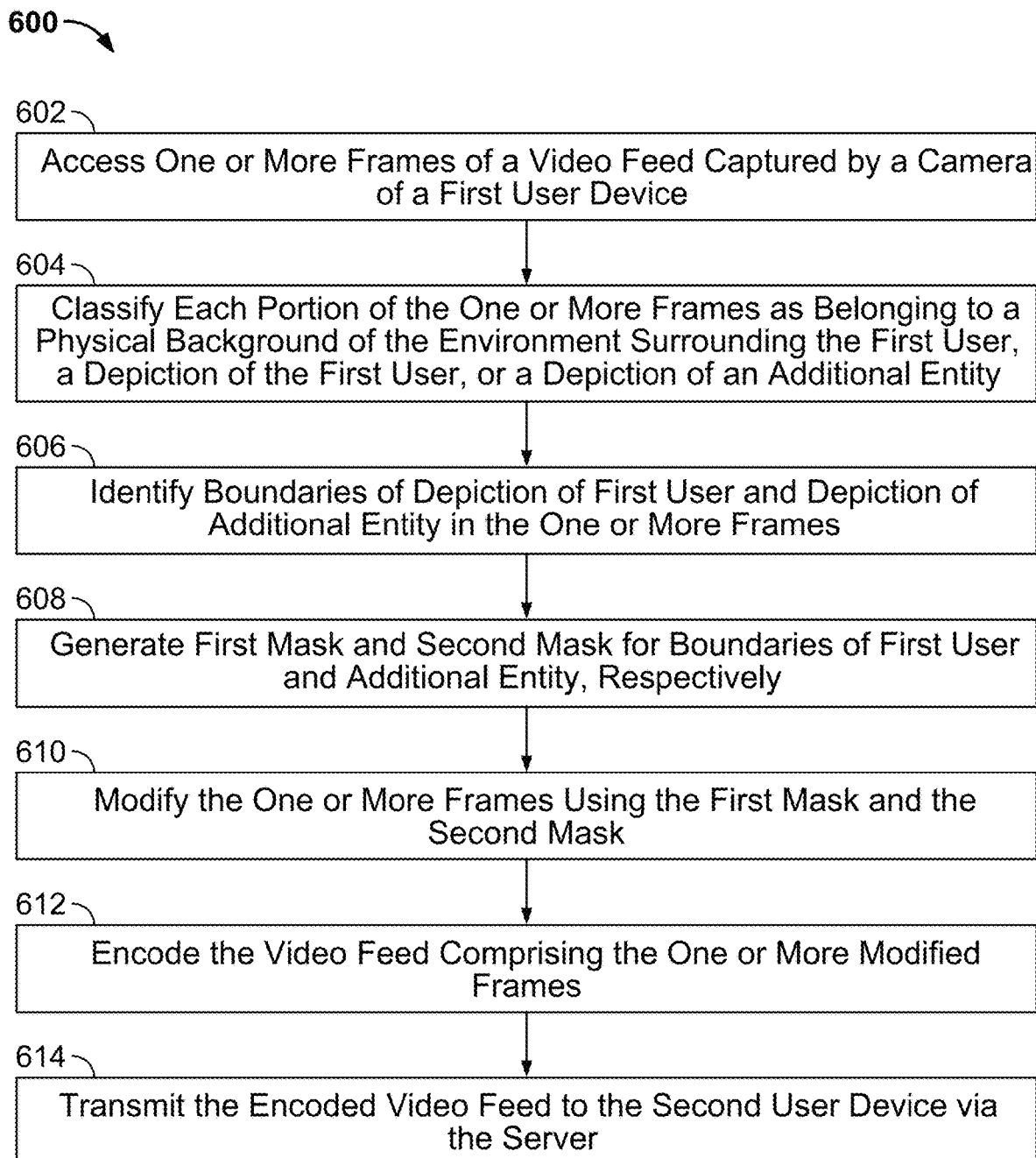
FIG. 6 is a flowchart of a detailed illustrative process for transmitting encoded video, in accordance with some embodiments of this disclosure.

FIG. 6 is a flowchart of a detailed illustrative process 600 for transmitting encoded video, in accordance with some embodiments of this disclosure. In various embodiments, the individual steps of process 600 may be implemented by one or more components of the devices and systems of FIGS. 1-4, and may be performed in combination with any of the other processes and aspects described herein. Although the present disclosure may describe certain steps of process 600 (and of other processes described herein) as being implemented by certain components of the devices and systems of FIGS. 1-4, this is for purposes of illustration only. It should be understood that other components of the devices and systems of FIGS. 1-4 may implement those steps instead.

At 602, the control circuitry (e.g., control circuitry 304 of user device 300 and/or control circuitry 411 of server 404) may access one or more frames of a video feed captured by a camera of a first user device (e.g., user device 104 of FIGS. 1A-1H, or user device 204 of FIG. 2). For example, the user device may be participating in a video communication session or otherwise recording video. In some embodiments, the control circuitry may read a video device driver to access such frames.

At 604, the control circuitry may classify each portion of the one or more frames as belonging to a particular category. For example, each pixel or a group of pixels may be classified as belonging to a background of the environment (e.g., physical background 116, which may or may not have an XR portion inserted therein), a depiction of the first user (e.g., depiction 112 of user 102 of FIG. 1B), or a depiction of an additional entity (e.g., user 118 of FIG. 1B). In some embodiments, one or more machine learning models may be employed, which may be trained to classify pixels of images as belonging to a particular entity and/or a particular type of entity (e.g., a person, an animal, a particular object, or as part of a background).

For example, a CNN model, or any other suitable image segmentation model, may be executed by the control circuitry to detect, for each input image, entities and/or a background by deciding with high certainty if a pixel in each frame belongs to a human, or the background (e.g., output a particular confidence score for one or more pixels or groups of pixels). In some embodiments, the machine learning model may be trained to learn portrait pixels, followed by performing semantic segmentation of portrait and shoulders of people shown in the video feed of the video communication session and may apply an XR portion to the video feed. Such segmentation may be performed for multiple persons and/or objects and/or animals detected by the camera of the user device. For example, pixels may be identified that do belong to a person, and that do not belong to a person.

At 606, the control circuitry may identify boundaries of depiction of first user (e.g., depiction 112 of user 102) and a depiction of additional entity (e.g., depiction of user 118 and/or a depiction of poster 126 of FIG. 1E) in the one or more frames. For example, the control circuitry may isolate the boundaries of the depiction of each person (or object), or a subset thereof, with respect to the other portions of the video feed corresponding to the virtual or physical background. The control circuitry may estimate distances of other people and/or faces and/or objects in the environment (e.g., physical environment 116 of FIG. 1B) with respect to the main person and/or main participant's face (e.g., user 102, closest to the camera), e.g., to ascertain depth information with respect to various detected entities in the video feed. In some embodiments, as permitted by the capability of a camera of the user device (e.g., user device 104) and/or the user device's circuitry and/or software, RGB and/or depth data may be contained in the captured image data. Based on such data, one or more sensors (e.g., light and/or infrared projectors and sensors or any other suitable sensors or any combination thereof) may be utilized to calculate depth effects or depth information. While first and second masks are described in FIG. 6, any suitable number of masks may be generated and utilized for any suitable number of entities detected in the video feed.

At 608, the control circuitry may generate a first mask and a second mask for boundaries of the first user (e.g., a portion of the video feed corresponding to depiction 112 of user 102) and an additional entity (e.g., a portion of the video feed corresponding to the depiction of user 118 of FIG. 1B), respectively. Such masks may be segmentation masks indicating a portion of the video frame that corresponds to the depiction of a particular entity. In some embodiments, motion of such entity may be tracked from frame to frame, e.g., the mask may be configured to follow the motion of the entity. In some embodiments, generation of the segmentation masks may be included as part of any of steps 604 and/or 606. In some embodiments, the control circuitry may be configured to generate a background mask (e.g., corresponding to environment 116 and/or the XR portions inserted at environment 116) and a foreground mask which may comprise the first mask and the second mask. Such foreground mask may be associated with different depth information (e.g., indicating that user 102 is closer to the camera of user device 104 than user 118).

At 610, the control circuitry may modify the one or more frames (accessed at 602) using the first mask and the second mask. For example, the control circuitry may combine or merge the first mask and the second mask with the portion of the frame corresponding to the background or environment surrounding the user (e.g., user 102). The control circuitry may combine or merge the first and second mask with the background mask. In some embodiments, one or more of such masks may be a binary mask, and the combining may comprise performing any suitable operation (e.g., pixel or bit-wise logical operations or any other suitable mathematical operations). Additionally or alternatively, the control circuitry may employ any suitable method to superimpose the XR portion (e.g., virtual background 108) at portions of the video feed other than the portions delineated by the first mask and the second mask.

At 612, the control circuitry may encode the video feed comprising the one or more modified frames. In some embodiments, prior to performing the encoding, the control circuitry may perform mixing of one or more masks (e.g., a background mask and a foreground mask), such as at 610. The control circuitry may perform any suitable compression and/or encoding techniques, e.g., to identify spatial and/or temporal similarities from frame to frame, e.g., location and/or shape of a particular mask and/or entity that remains consistent over multiple frames, to exploit redundancies between such frames as part of the encoding process. In some embodiments, the control circuitry may, in performing the encoding, employ the High Efficiency Video Coding (HEVC) H.265 standard, the Versatile Video Coding (VVC) H.266 standard, the H.264 standard, the H.263 standard, MPEG-4, MPEG-2, or any other suitable codec or standard, or any combination thereof.

At 614, the control circuitry may transmit the encoded video feed to the second user device (e.g., a user device of user 106) via the server (e.g., server 404 of FIG. 4), and the second user device may decode the data and generate the video feed for presentation.

In some embodiments, the classification of 604, and subsequent steps of FIG. 6, may be performed based on or in response to receiving a user input (e.g., as described in connection with FIGS. 1A-1H, and/or FIGS. 2A-2B and FIG. 5, e.g., at 512. For example, the second mask associated with the additional entity (e.g., user 118 of FIG. 1C) may be generated based on receiving user input of a particular entity that should not be occluded by the XR portion, and/or based on receiving user input of one or more particular depths in the video frame at which the XR portion should not be inserted.

Figure 7:
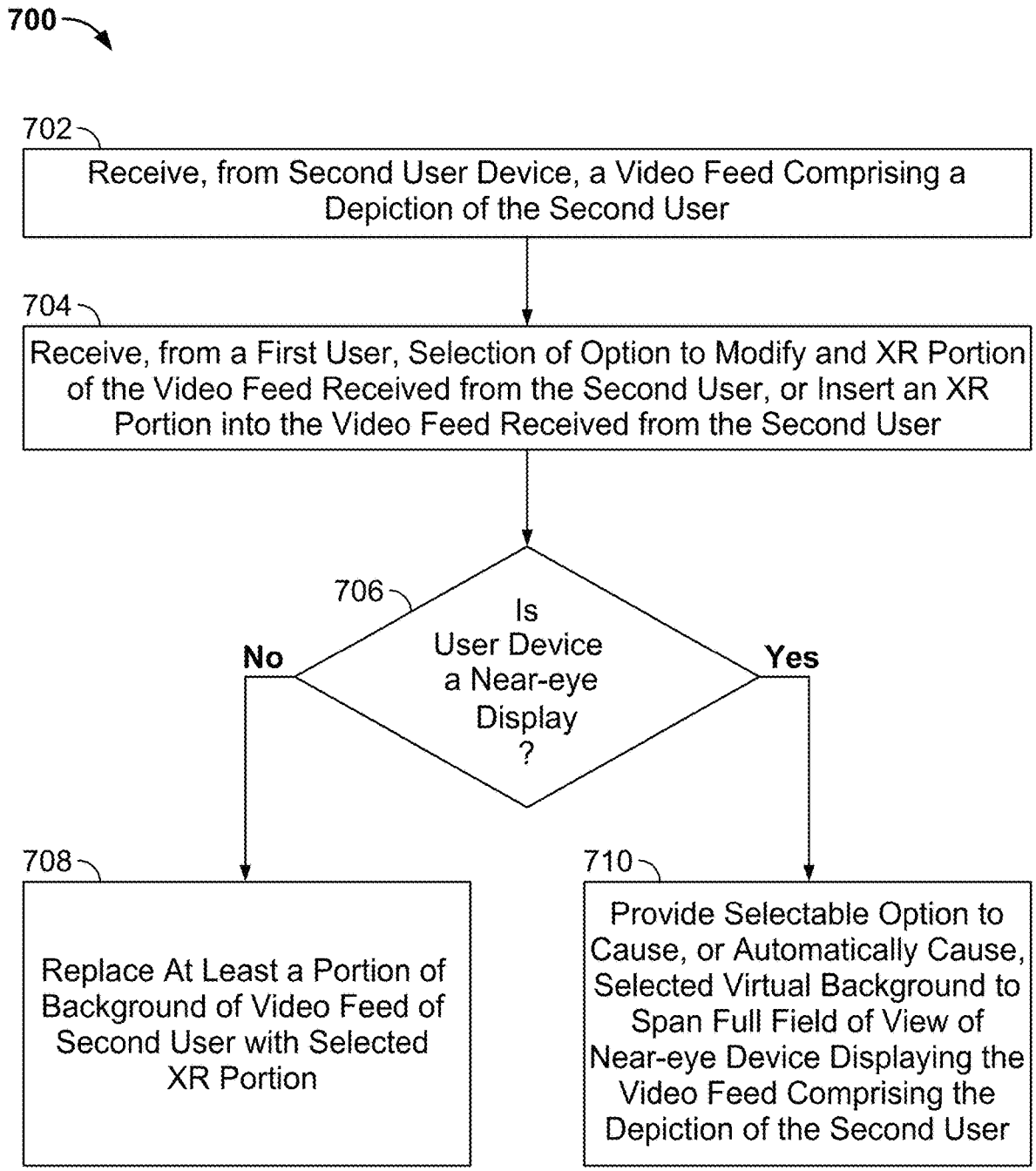
FIG. 7 is a flowchart of a detailed illustrative process for enabling user-controlled extended reality, in accordance with some embodiments of this disclosure.

FIG. 7 is a flowchart of a detailed illustrative process 700 for transmitting encoded video, in accordance with some embodiments of this disclosure. In various embodiments, the individual steps of process 700 may be implemented by one or more components of the devices and systems of FIGS. 1-4, and may be performed in combination with any of the other processes and aspects described herein. Although the present disclosure may describe certain steps of process 700 (and of other processes described herein) as being implemented by certain components of the devices and systems of FIGS. 1-4, this is for purposes of illustration only. It should be understood that other components of the devices and systems of FIGS. 1-4 may implement those steps instead.

At 702, the control circuitry (e.g., control circuitry 304 of user device 300 and/or control circuitry 411 of server 404) may receive a video feed from a second user device (e.g., a device of user 106 of FIG. 1B) comprising a depiction of the second user (e.g., depiction 114 of user 106 of FIG. 1B or a depiction of user 206 of FIG. 2B). In some embodiments, such video feed received from the second user device may comprise at least one XR portion (e.g., selected by the second user).

At 704, the control circuitry may receive, from a first user (e.g., user 102 of FIG. 1B or user 202 of FIG. 2A), a selection of an option to modify an XR portion of the video feed received from the second user, or to insert an XR portion into the video feed received from the second user. For example, user 102 may request that XR portion 110 be changed from a beach and ocean scene (FIG. 1E) to a mountainous scene (FIG. 1G), or a user may otherwise request to insert an XR portion into a received video feed that does not include an XR portion. In some embodiments, the user may request that any entities in the received video feed from the second user device not be occluded by the XR portion. In some embodiments, consent from the user may be requested or required prior to performing modification or insertion of an XR portion or revealing any entities concealed by the XR portion. In some embodiments, the input may be received via user interface element 128, and/or the XR portion for the incoming received video stream may be caused to match the first user's preferred XR portion and/or preferred XR portion for the second user.

At 706, the control circuitry (e.g., server 404 of FIG. 4) may determine whether the first user device is a near-eye display (e.g., such as near-eye display device 204 of FIG. 2), such as based on a device identifier or other indication received from or stored for the first user device, or using any other suitable technique. If yes, processing may proceed to 710; otherwise processing may proceed to 708.

At 710, in response to determining the first user device is a near-eye device, the control circuitry (e.g., control circuitry 304 of user device 300 and/or control circuitry 411 of server 404) may provide a selectable option to cause, or may automatically cause, the selected virtual background to span a full field of view of near-eye device. For example, selection of such option may cause the control circuitry to replace a cluttered background of the physical environment seen by the first user of the near-eye device in his or her field of view adjacent to the depiction of user 206, with an office setting to surround the depiction of user 206. In some embodiments, such insertion may be performed automatically (e.g., based on detecting the field of view of user 106 is cluttered and/or other audio or visual distractions are present in the environment of user 106).

At 708, if a first user device is not a near-eye device, the control circuitry may cause at least a portion of the background of the video feed of a second user with the selected XR portion. For example, user 106 may request that XR portion 110 be changed from a beach and ocean scene (FIG. 1E) to a mountainous scene (FIG. 1G), or a user may otherwise request to insert an XR portion into a received video feed that does not include an XR portion. For example, after decoding the received video stream, the control circuitry may be configured to reconstruct a modified feed based on the selected or preferred XR portion, which may include re-segmenting the depiction of the second user and/or any other entities in the received video feed.

In some embodiments, such as when the first user device is determined to be a near-eye display device or regardless of whether the first user device is determined to be a near-eye display device, the control circuitry may detect other people or objects or animals appearing within the field of view of the user or camera. The control circuitry may notify the first user of this and/or cause such moving entities not to be occluded by the XR portion.

In some embodiments, the video communication application may utilize depth sensing techniques (e.g., a LiDAR scanner on a smartphone and/or smart glasses, a front-facing camera, and/or any other suitable sensor or technique) to map movement that is occurring within physical environment 201 and/or specific objects or persons in physical environment 201, and may update the virtual background accordingly. In some embodiments, even if user 202 does not indicate via user interface element 128 or another input that detected entities in environment 201 should not be occluded by the XR portion of the video feed, if the video communication application executing at least in part on near-eye display device 204 detects a person or object approaching user 202, it may update the XR portion being rendered. For example, the video communication application executing at least in part on near-eye display device 204 may override the XR portion and overlay such one or more detected entities while filling out the field of view of near-eye display device 204. In some embodiments, if the conversation is a video call, the video communication application may cause the XR portion transmitted via user device of user 206 to span the entire field of view of near-eye display device 204, to cover the physical environment behind the glass.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A system comprising:
a first user device associated with a first user, wherein a server is configured to establish a video communication session over a network, and wherein the video communication session enables the first user device to present a depiction of a second user, associated with a second user device, and an environment surrounding the second user, and the video communication session enables the second user device to present a depiction of the first user and an environment surrounding the first user, and wherein a portion of the environment surrounding the first user comprises an entity other than the first user; and
control circuitry configured to:
determine that an extended reality (XR) portion should be included in a video feed of the video communication session, wherein the video feed comprises the depiction of the first user, and the XR portion is configured to occlude the entity in the video feed;
detect the entity in the video feed;
generate for display a user interface element, at which user input specifying that the entity should not be occluded by the XR portion in the video feed is received, the user interface element including a plurality of options comprising:
a first option to cause the video feed to comprise the XR portion surrounding the depiction of the first user and occluding any entities in a background surrounding the first user;
a second option to cause the video feed to comprise the XR portion, the first user, and one or more additional users detected in the environment surrounding the first user:
a third option to cause the video feed to comprise the XR portion, the first user, and one or more objects detected in the environment surrounding the first user; and
a fourth option to cause the video feed to comprise no XR portion surrounding the depiction of the first user;
receive the user input specifying that the entity should not be occluded by the XR portion in the video feed;
modify, based on the user input, the video feed to exclude the XR portion from a portion of the video feed depicting the detected entity, wherein the XR portion is included at a different portion of the video feed, and the depiction of the first user is included in the video feed; and
transmit the modified video feed to the second user device via the server.

2. The system of claim 1, wherein the video communication session corresponds to:

a video conference in which the first user and the second user are participants, the XR portion is a virtual background simultaneously presented with the depiction of the first user, and the virtual background does not occlude the entity specified by the user input; or an augmented reality scene simultaneously presented with the depiction of the first user.

3. The system of claim 1, wherein the entity corresponds to one or more other users in the environment surrounding the first user or one or more objects in the environment surrounding the first user.

4. The system of claim 1, wherein the server is further configured to:
receive an API request from a service provider; and
transmit, via an API, one or more software tools to enable the service provider to perform one or more of the determining, the detecting, the receiving, the modifying and the transmitting.

5. The system of claim 1, wherein the control circuitry is configured to receive the user input specifying that the entity should not be occluded by the XR portion in the video feed during the video communication session and perform the modifying by dynamically modifying the video feed to exclude the XR portion from the portion of the video feed depicting the detected entity.

6. The system of claim 1, wherein the video feed is a first video feed, and wherein the XR portion is a first XR portion, and the control circuitry is further configured to:
receive, via the server and from the second user device, a second video feed comprising a second XR portion modifying an appearance of the environment surrounding the second user; and
modify, based on user input received from the first user, the appearance of the environment surrounding the second user, for presentation at the first user device.

7. A system comprising:
a first user device associated with a first user, wherein a server is configured to establish a video communication session over a network, and wherein the video communication session enables the first user device to present a depiction of a second user, associated with a second user device, and an environment surrounding the second user, and the video communication session enables the second user device to present a depiction of the first user and an environment surrounding the first user, and wherein a portion of the environment surrounding the first user comprises an entity other than the first user; and
control circuitry configured to:
determine that an extended reality (XR) portion should be included in a video feed of the video communication session, wherein the video feed comprises the depiction of the first user, and the XR portion is configured to occlude the entity in the video feed;
detect the entity in the video feed;
receive user input specifying that the entity should not be occluded by the XR portion in the video feed;
modify, based on the user input, the video feed to exclude the XR portion from a portion of the video feed depicting the detected entity, wherein the XR portion is included at a different portion of the video feed, and the depiction of the first user is included in the video feed;
transmit the modified video feed to the second user device via the server;
determine ambient conditions of the environment surrounding the first user; and
determine whether one or more entities should not be occluded from the XR portion based on the determined ambient conditions.

8. The system of claim 1, wherein the first user device corresponds to a near-eye display device, and wherein the video feed is a first video feed, and wherein the XR portion is a first XR portion, and the control circuitry is further configured to:
receive, via the server and from the second user device, a second video feed comprising the depiction of the second user; and
cause a second XR portion to span a full field of view of the near-eye display device, while generating for display the second video feed depiction of the second user.

9. The system of claim 8, wherein the entity is a first entity, and wherein the control circuitry is further configured to:
detect that a second entity is moving within the environment surrounding the first user; and
cause the detected second entity not to be occluded by the second XR portion otherwise spanning the full field of view of the near-eye display device.

10. A method comprising:
determining that a first extended reality (XR) portion should be included in a first video feed of a video communication session, wherein the first video feed comprises a depiction of a first user associated with a first user device, and wherein the first user device corresponds to a near-eye display device, and the first XR portion is configured to occlude a first entity in the first video feed, and wherein the video communication session is established by a server over a network and enables the first user device to present a depiction of a second user, associated with a second user device, and an environment surrounding the second user, and the video communication session enables the second user device to present the depiction of the first user and an environment surrounding the first user;
detecting the first entity other than the first user in the first video feed;
receiving user input specifying that the first entity should not be occluded by the first XR portion in the first video feed;
modifying, based on the user input, the first video feed to exclude the first XR portion from a portion of the first video feed depicting the detected first entity, wherein the first XR portion is included at a different portion of the first video feed, and the depiction of the first user is included in the first video feed;
transmitting the modified first video feed to the second user device via the server;
receiving, via the server and from the second user device, a second video feed comprising the depiction of the second user;
causing a second XR portion to span a full field of view of the near-eye display device, while generating for display the second video feed depiction of the second user;
detecting that a second entity is moving within the environment surrounding the first user; and
causing the detected second entity not to be occluded by the second XR portion otherwise spanning the full field of view of the near-eye display device.

11. The method of claim 10, wherein the video communication session corresponds to:
a video conference in which the first user and the second user are participants, the first XR portion is a virtual background simultaneously presented with the depiction of the first user, and the virtual background does not occlude the first entity specified by the user input; or an augmented reality scene simultaneously presented with the depiction of the first user.

12. The method of claim 10, wherein the first entity corresponds to one or more other users in the environment surrounding the first user or one or more objects in the environment surrounding the first user.

13. The method of claim 10, wherein the server is further configured to:
receive an API request from a service provider; and
transmit, via an API, one or more software tools to enable the service provider to perform one or more of the determining, the detecting, the receiving, the modifying and the transmitting.

14. The method of claim 10, further comprising generating for display a user interface element, at which the user input specifying that the first entity should not be occluded by the first XR portion in the first video feed is received, the user interface element including a plurality of options comprising:
a first option to cause the first video feed to comprise the first XR portion surrounding the depiction of the first user and occluding any entities in a background surrounding the first user;
a second option to cause the first video feed to comprise the first XR portion, the first user, and one or more additional users detected in the environment surrounding the first user;
a third option to cause the first video feed to comprise the first XR portion, the first user, and one or more objects detected in the environment surrounding the first user; and
a fourth option to cause the first video feed to comprise no first XR portion surrounding the depiction of the first user.

15. The method of claim 10, wherein the user input specifying that the first entity should not be occluded by the first XR portion in the first video feed is received during the video communication session and the modifying comprises dynamically modifying the first video feed to exclude the first XR portion from the portion of the first video feed depicting the detected first entity.

16. The method of claim 10, wherein the second video feed comprises the second XR portion modifying an appearance of the environment surrounding the second user, and the method further comprises:
modifying, based on user input received from the first user, the appearance of the environment surrounding the second user, for presentation at the first user device.

17. The method of claim 10, wherein the method further comprises:
determining ambient conditions of the environment surrounding the first user; and
determining whether one or more entities should not be occluded from the first XR portion based on the determined ambient conditions.

18. The system of claim 1, wherein the video communication session corresponds to a video conference in which the first user and the second user are participants, the XR portion is a virtual background simultaneously presented with the depiction of the first user, and the virtual background does not occlude the entity specified by the user input.

19. The system of claim 7, wherein the video communication session corresponds to a video conference in which the first user and the second user are participants, the XR portion is a virtual background simultaneously presented with the depiction of the first user, and the virtual background does not occlude the entity specified by the user input.

20. The method of claim 10, wherein the video communication session corresponds to a video conference in which the first user and the second user are participants, the first XR portion is a virtual background simultaneously presented with the depiction of the first user, and the virtual background does not occlude the first entity specified by the user input.

* * * * *